United States Patent
Wang-Aryattanwanich et al.

(10) Patent No.: US 7,992,085 B2
(45) Date of Patent: Aug. 2, 2011

(54) LIGHTWEIGHT REFERENCE USER INTERFACE

(75) Inventors: Thiti Wang-Aryattanwanich, Sammamish, WA (US); Eric D. Bailey, Redmond, WA (US); Anatoliy Burukhin, Issaquah, WA (US); Christopher Pratley, Seattle, WA (US); Roberto C. Taboada, Duvall, WA (US); Srinivas Voora, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 822 days.

(21) Appl. No.: 11/803,689

(22) Filed: May 15, 2007

(65) Prior Publication Data

US 2008/0021886 A1 Jan. 24, 2008

Related U.S. Application Data

(63) Continuation-in-part of application No. 11/234,968, filed on Sep. 26, 2005, now Pat. No. 7,788,590.

(51) Int. Cl.
*G06F 3/00* (2006.01)
(52) U.S. Cl. .............................. 715/711; 715/808
(58) Field of Classification Search ................. 715/808, 715/711
See application file for complete search history.

(56) References Cited

U.S. PATENT DOCUMENTS

| | | | |
|---|---|---|---|
| 4,674,065 A | 6/1987 | Lange et al. ............. 382/311 |
| 4,791,587 A | 12/1988 | Doi | |
| 4,868,750 A | 9/1989 | Kucera et al. ............. 711/2 |
| 5,005,127 A | 4/1991 | Kugimiya et al. | |
| 5,020,019 A | 5/1991 | Ogawa ................. 707/5 |
| 5,128,865 A | 7/1992 | Sadler ................. 704/2 |
| 5,159,552 A | 10/1992 | van Gasteren et al. ....... 704/1 |
| 5,251,130 A | 10/1993 | Andrews et al. | |
| 5,267,155 A | 11/1993 | Buchanan et al. ............. 715/540 |
| 5,287,448 A | 2/1994 | Nicol et al. | |
| 5,297,039 A | 3/1994 | Kanaegami et al. ............. 707/5 |
| 5,303,151 A | 4/1994 | Neumann | |
| 5,317,546 A | 5/1994 | Balch et al. ............. 368/9 |
| 5,337,233 A | 8/1994 | Hofert et al. ............. 715/540 |
| 5,341,293 A | 8/1994 | Vertelney et al. ............. 715/530 |
| 5,351,190 A | 9/1994 | Kondo ................. 704/8 |
| 5,386,564 A | 1/1995 | Shearer et al. ............. 395/650 |
| 5,392,386 A | 2/1995 | Chalas ................. 715/841 |

(Continued)

FOREIGN PATENT DOCUMENTS

CA 2 246 920 A1 3/2000

(Continued)

OTHER PUBLICATIONS

SYSTRAN, "Systran Home Translator 2007—The World's Best-Selling Language Translation Software," Date: 2007, pp. 1-2, www.systransoft.com/download/ProductDatasheets/SYSTRAN.Home.Translator.pdf.

(Continued)

*Primary Examiner* — Dennis Bonshock
(74) *Attorney, Agent, or Firm* — Merchant & Gould P.C.

(57) ABSTRACT

A lightweight information user interface is provided for displaying information about a focused-on (e.g., mouse-over) text item, data item or other object in an electronic document that minimizes interruption of workflow with the electronic document. Upon focus on a word or other object in an electronic document a quick look-up function may be invoked for retrieving information from a local or remote information source about the focused-on item. Retrieved information, for example, translations, dictionary definitions and research information, is displayed in close proximity to the focused-on item in a lightweight information user interface. Information may be displayed according to a variety of media types including text, audio, video, pictures, bitmap images, etc.

17 Claims, 11 Drawing Sheets

U.S. PATENT DOCUMENTS

| | | | |
|---|---|---|---|
| 5,418,902 A | 5/1995 | West et al. | 715/503 |
| 5,446,891 A | 8/1995 | Kaplan et al. | 707/2 |
| 5,522,089 A | 5/1996 | Kikinis et al. | |
| 5,535,323 A | 7/1996 | Miller et al. | |
| 5,541,836 A | 7/1996 | Church et al. | 704/7 |
| 5,546,521 A | 8/1996 | Martinez | |
| 5,581,684 A | 12/1996 | Dudzik et al. | |
| 5,596,700 A | 1/1997 | Darnell et al. | 715/512 |
| 5,617,565 A | 4/1997 | Augenbraun et al. | 707/4 |
| 5,625,783 A | 4/1997 | Ezekiel et al. | 395/352 |
| 5,627,567 A | 5/1997 | Davidson | |
| 5,627,958 A | 5/1997 | Potts et al. | 715/708 |
| 5,629,846 A | 5/1997 | Crapo | |
| 5,634,019 A | 5/1997 | Koppolu et al. | 715/744 |
| 5,640,560 A | 6/1997 | Smith | 707/104.1 |
| 5,657,259 A | 8/1997 | Davis et al. | 708/204 |
| 5,685,000 A | 11/1997 | Cox | 704/9 |
| 5,708,825 A | 1/1998 | Sotomayor | 715/501.1 |
| 5,715,415 A | 2/1998 | Dazey et al. | |
| 5,717,923 A | 2/1998 | Dedrick | 707/102 |
| 5,752,022 A | 5/1998 | Chiu et al. | 707/10 |
| 5,761,689 A | 6/1998 | Rayson et al. | 707/533 |
| 5,764,794 A | 6/1998 | Perlin | |
| 5,765,156 A | 6/1998 | Guzak et al. | 707/100 |
| 5,781,189 A | 7/1998 | Holleran et al. | 715/826 |
| 5,781,904 A | 7/1998 | Oren et al. | 707/100 |
| 5,794,257 A | 8/1998 | Liu et al. | 715/501.1 |
| 5,799,068 A | 8/1998 | Kikinis et al. | |
| 5,802,253 A | 9/1998 | Gross et al. | 395/51 |
| 5,802,262 A | 9/1998 | Van De Vanter | 714/1 |
| 5,802,299 A | 9/1998 | Logan et al. | 709/218 |
| 5,802,530 A | 9/1998 | van Hoff | 715/513 |
| 5,805,911 A | 9/1998 | Miller | 715/534 |
| 5,809,318 A | 9/1998 | Rivette et al. | 715/512 |
| 5,815,830 A | 9/1998 | Anthony | 707/6 |
| 5,818,447 A | 10/1998 | Wolf et al. | 715/752 |
| 5,819,273 A | 10/1998 | Vora et al. | |
| 5,821,931 A | 10/1998 | Berquist et al. | 715/784 |
| 5,822,539 A | 10/1998 | van Hoff | 709/236 |
| 5,822,720 A | 10/1998 | Bookman et al. | |
| 5,826,025 A | 10/1998 | Gramlich | 709/217 |
| 5,832,100 A | 11/1998 | Lawton et al. | 382/100 |
| 5,845,077 A | 12/1998 | Fawcett | 709/221 |
| 5,845,278 A | 12/1998 | Kirsch et al. | |
| 5,848,386 A | 12/1998 | Motoyama | |
| 5,855,007 A | 12/1998 | Jovicic et al. | 705/14 |
| 5,859,636 A | 1/1999 | Pandit | 715/501.1 |
| 5,872,973 A | 2/1999 | Mitchell et al. | 395/685 |
| 5,875,443 A | 2/1999 | Nielsen | 707/2 |
| 5,877,757 A | 3/1999 | Baldwin et al. | 715/705 |
| 5,884,266 A | 3/1999 | Dvorak | |
| 5,892,919 A | 4/1999 | Nielsen | 395/200.58 |
| 5,893,073 A | 4/1999 | Kasso et al. | 705/8 |
| 5,893,132 A | 4/1999 | Huffman et al. | |
| 5,895,461 A | 4/1999 | De La Huerga et al. | 707/1 |
| 5,896,321 A | 4/1999 | Miller et al. | 365/189.01 |
| 5,900,004 A | 5/1999 | Gipson | 707/530 |
| 5,907,852 A | 5/1999 | Yamada | 715/541 |
| 5,913,214 A | 6/1999 | Madnick et al. | 707/10 |
| 5,920,859 A | 7/1999 | Li | 707/5 |
| 5,924,099 A | 7/1999 | Guzak et al. | 707/100 |
| 5,933,139 A | 8/1999 | Feigner et al. | |
| 5,933,140 A | 8/1999 | Strahorn et al. | |
| 5,933,498 A | 8/1999 | Schneck et al. | 705/54 |
| 5,940,614 A | 8/1999 | Allen et al. | |
| 5,944,787 A | 8/1999 | Zoken | 709/206 |
| 5,946,647 A | 8/1999 | Miller et al. | 704/9 |
| 5,948,061 A | 9/1999 | Merriman et al. | 709/219 |
| 5,956,681 A | 9/1999 | Yamakita | 704/260 |
| 5,974,409 A | 10/1999 | Sanu et al. | |
| 5,974,413 A | 10/1999 | Beauregard et al. | 707/6 |
| 5,978,754 A | 11/1999 | Kumano | |
| 5,983,216 A | 11/1999 | Kirsch et al. | |
| 5,983,218 A | 11/1999 | Syeda-Mahmood | |
| 5,987,402 A | 11/1999 | Murata et al. | |
| 5,987,480 A | 11/1999 | Donohue et al. | 715/501.1 |
| 5,991,719 A | 11/1999 | Yazaki et al. | 704/251 |
| 5,995,756 A | 11/1999 | Hermann | 395/712 |
| 5,995,979 A | 11/1999 | Cochran | |
| 6,006,265 A | 12/1999 | Rangan et al. | 709/226 |
| 6,006,279 A | 12/1999 | Hayes | 719/328 |
| 6,014,616 A | 1/2000 | Kim | 704/8 |
| 6,018,761 A | 1/2000 | Uomini | 706/206 |
| 6,026,388 A | 2/2000 | Liddy et al. | |
| 6,028,605 A | 2/2000 | Conrad et al. | 345/840 |
| 6,029,135 A | 2/2000 | Krasle | |
| 6,029,171 A | 2/2000 | Smiga et al. | |
| 6,031,525 A | 2/2000 | Perlin | |
| 6,052,531 A | 4/2000 | Waldin et al. | 717/170 |
| 6,061,516 A | 5/2000 | Yoshikawa et al. | 717/109 |
| 6,061,701 A | 5/2000 | Hirai et al. | |
| 6,064,951 A | 5/2000 | Park et al. | |
| 6,067,087 A | 5/2000 | Krauss et al. | 715/762 |
| 6,072,475 A | 6/2000 | Van Ketwich | |
| 6,073,090 A | 6/2000 | Fortune | |
| 6,085,201 A | 7/2000 | Tso | 715/505 |
| 6,088,711 A | 7/2000 | Fein et al. | 715/523 |
| 6,092,074 A | 7/2000 | Rodkin et al. | 707/102 |
| 6,102,969 A | 8/2000 | Christianson et al. | |
| 6,108,640 A | 8/2000 | Slotznick | 705/26 |
| 6,108,674 A | 8/2000 | Murakami et al. | 715/515 |
| 6,112,209 A | 8/2000 | Gusack | 707/101 |
| 6,121,968 A | 9/2000 | Arcuri et al. | 345/352 |
| 6,122,647 A | 9/2000 | Horowitz et al. | 715/513 |
| 6,126,306 A | 10/2000 | Ando | 708/605 |
| 6,137,911 A | 10/2000 | Zhilyaev | 382/225 |
| 6,141,005 A | 10/2000 | Hetherington et al. | 715/866 |
| 6,151,643 A | 11/2000 | Cheng et al. | 710/36 |
| 6,154,738 A | 11/2000 | Call | 707/4 |
| 6,167,469 A | 12/2000 | Safai et al. | |
| 6,167,523 A | 12/2000 | Strong | |
| 6,167,568 A | 12/2000 | Gandel et al. | 717/176 |
| 6,173,316 B1 | 1/2001 | De Boor et al. | 709/218 |
| 6,182,029 B1 | 1/2001 | Friedman | 704/9 |
| 6,185,550 B1 | 2/2001 | Snow et al. | 707/1 |
| 6,185,576 B1 | 2/2001 | McIntosh | 707/200 |
| 6,199,046 B1 | 3/2001 | Heinzle et al. | 705/1 |
| 6,199,081 B1 | 3/2001 | Meyerzon et al. | 715/513 |
| 6,208,338 B1 | 3/2001 | Fischer et al. | |
| 6,219,698 B1 | 4/2001 | Iannucci et al. | 709/221 |
| 6,246,404 B1 | 6/2001 | Feigner et al. | |
| 6,262,728 B1 | 7/2001 | Alexander | 345/440.1 |
| 6,272,074 B1 | 8/2001 | Winner | 368/10 |
| 6,272,505 B1 | 8/2001 | De La Huerga | 707/501 |
| 6,282,489 B1 | 8/2001 | Bellesfield et al. | |
| 6,282,537 B1 | 8/2001 | Madnick et al. | |
| 6,291,785 B1 | 9/2001 | Koga et al. | |
| 6,292,768 B1 | 9/2001 | Chan | 704/1 |
| 6,295,061 B1 | 9/2001 | Park et al. | 715/764 |
| 6,297,822 B1 | 10/2001 | Feldman | |
| 6,300,950 B1 | 10/2001 | Clark et al. | |
| 6,308,171 B1 | 10/2001 | De La Huerga | 707/3 |
| 6,311,152 B1 | 10/2001 | Bai et al. | |
| 6,311,177 B1 | 10/2001 | Dauerer et al. | 707/2 |
| 6,311,194 B1 | 10/2001 | Sheth et al. | 715/505 |
| 6,320,496 B1 | 11/2001 | Sokoler et al. | |
| 6,323,853 B1 | 11/2001 | Hedloy | 345/339 |
| 6,336,125 B2 | 1/2002 | Noda et al. | 715/531 |
| 6,336,131 B1 | 1/2002 | Wolfe et al. | 709/203 |
| 6,338,059 B1 | 1/2002 | Fields et al. | 707/4 |
| 6,339,436 B1 | 1/2002 | Amro et al. | |
| 6,339,755 B1 | 1/2002 | Hetherington et al. | |
| 6,347,398 B1 | 2/2002 | Parthasarathy et al. | 717/170 |
| 6,349,295 B1 | 2/2002 | Tedesco et al. | 707/3 |
| 6,353,926 B1 | 3/2002 | Parthesarathy et al. | 717/11 |
| 6,381,742 B2 | 4/2002 | Forbes et al. | 717/176 |
| 6,382,350 B1 | 5/2002 | Jezewski et al. | |
| 6,392,668 B1 | 5/2002 | Murray | |
| 6,396,515 B1 | 5/2002 | Hetherington et al. | |
| 6,401,067 B2 | 6/2002 | Lewis et al. | |
| 6,408,323 B1 | 6/2002 | Kobayashi et al. | 709/100 |
| 6,413,100 B1 | 7/2002 | Dickmeyer et al. | |
| 6,415,304 B1 | 7/2002 | Horvitz | |
| 6,421,678 B2 | 7/2002 | Smiga et al. | |
| 6,424,979 B1 | 7/2002 | Livingston et al. | 715/511 |
| 6,424,980 B1 | 7/2002 | Izuka et al. | |
| 6,434,567 B1 | 8/2002 | De La Huerga | 707/102 |

| | | |
|---|---|---|
| 6,438,545 B1 | 8/2002 | Beauregard et al. ............... 707/6 |
| 6,441,753 B1 | 8/2002 | Montgomery |
| 6,442,545 B1 | 8/2002 | Feldman et al. |
| 6,442,591 B1 | 8/2002 | Haynes et al. |
| 6,456,304 B1 | 9/2002 | Anguilo et al. |
| 6,470,091 B2 | 10/2002 | Koga et al. |
| 6,473,069 B1 | 10/2002 | Gerpheide |
| 6,493,006 B1 | 10/2002 | Gourdol et al. ............... 345/825 |
| 6,477,510 B1 | 11/2002 | Johnson ........................ 705/30 |
| 6,480,860 B1 | 11/2002 | Monday ....................... 707/102 |
| 6,498,982 B2 | 12/2002 | Bellesfield |
| 6,507,839 B1 | 1/2003 | Ponte |
| 6,510,504 B2 | 1/2003 | Satyanarayanan |
| 6,516,321 B1 | 2/2003 | De La Huerga ............... 707/102 |
| 6,519,557 B1 | 2/2003 | Emens et al. ..................... 704/8 |
| 6,519,603 B1 | 2/2003 | Bays et al. .................... 707/102 |
| 6,529,899 B1 | 3/2003 | Kraft et al. |
| 6,546,433 B1 | 4/2003 | Matheson ..................... 709/318 |
| 6,553,385 B2 | 4/2003 | Johnson et al. ............ 707/104.1 |
| 6,556,972 B1 | 4/2003 | Bakis et al. |
| 6,556,984 B1 | 4/2003 | Zien ............................... 707/2 |
| 6,563,514 B1 * | 5/2003 | Samar ........................... 715/711 |
| 6,564,264 B1 | 5/2003 | Creswell et al. ............... 709/245 |
| 6,571,241 B1 | 5/2003 | Nosohara ......................... 707/6 |
| 6,571,253 B1 | 5/2003 | Thompson et al. |
| 6,591,260 B1 | 7/2003 | Schwarzhoff et al. |
| 6,595,342 B1 | 7/2003 | Maritzen et al. |
| 6,601,075 B1 | 7/2003 | Huang et al. |
| 6,604,099 B1 | 8/2003 | Chung et al. |
| 6,615,131 B1 | 9/2003 | Rennard et al. |
| 6,618,733 B1 | 9/2003 | White et al. ................... 707/103 |
| 6,622,140 B1 | 9/2003 | Kantrowitz ....................... 707/5 |
| 6,623,527 B1 | 9/2003 | Hamzy ......................... 715/513 |
| 6,625,581 B1 | 9/2003 | Perkowski ...................... 705/27 |
| 6,629,079 B1 | 9/2003 | Spiegel et al. ................. 705/26 |
| 6,629,092 B1 | 9/2003 | Berke |
| 6,631,519 B1 | 10/2003 | Nicholson et al. ............ 717/169 |
| 6,636,880 B1 | 10/2003 | Bera ............................. 708/206 |
| 6,643,650 B1 | 11/2003 | Slaughter et al. |
| 6,654,734 B1 | 11/2003 | Mani et al. |
| 6,654,932 B1 | 11/2003 | Bahrs et al. |
| 6,658,623 B1 | 12/2003 | Schilit et al. .................. 715/513 |
| 6,687,485 B2 | 2/2004 | Hopkins et al. ............... 434/350 |
| 6,694,307 B2 | 2/2004 | Julien ............................. 707/3 |
| 6,697,824 B1 | 2/2004 | Bowman-Amuah ......... 709/229 |
| 6,697,837 B1 | 2/2004 | Rodov ........................... 709/203 |
| 6,708,189 B1 | 3/2004 | Fitzsimons et al. ............ 707/205 |
| 6,715,144 B2 | 3/2004 | Daynes et al. ................. 717/173 |
| 6,717,593 B1 | 4/2004 | Jennings ....................... 715/760 |
| 6,718,516 B1 | 4/2004 | Claussen et al. .............. 715/513 |
| 6,724,403 B1 | 4/2004 | Santoro et al. |
| 6,728,679 B1 | 4/2004 | Strubbe et al. ............. 704/270.1 |
| 6,732,090 B2 | 5/2004 | Shanahan et al. ................ 707/3 |
| 6,732,361 B1 | 5/2004 | Andreoli et al. ............... 719/313 |
| 6,741,994 B1 | 5/2004 | Kang et al. |
| 6,742,054 B1 | 5/2004 | Upton, IV |
| 6,745,178 B1 | 6/2004 | Emens et al. |
| 6,745,208 B2 | 6/2004 | Berg et al. ..................... 707/201 |
| 6,766,326 B1 | 7/2004 | Cena |
| 6,785,670 B1 | 8/2004 | Chiang |
| 6,795,808 B1 | 9/2004 | Strubbe et al. ................ 704/275 |
| 6,802,061 B1 | 10/2004 | Parthasarathy et al. ........ 717/173 |
| 6,826,726 B2 | 11/2004 | Hsing et al. ................... 715/513 |
| 6,829,631 B1 | 12/2004 | Forman et al. |
| 6,845,499 B2 | 1/2005 | Srivastava et al. |
| 6,857,103 B1 | 2/2005 | Wason |
| 6,859,908 B1 | 2/2005 | Clapper |
| 6,868,525 B1 | 3/2005 | Szabo |
| 6,868,625 B2 | 3/2005 | Jacobsen et al. .............. 715/738 |
| 6,874,125 B1 | 3/2005 | Carroll et al. |
| 6,874,143 B1 | 3/2005 | Murray et al. ................ 717/173 |
| 6,880,129 B1 | 4/2005 | Lee et al. ....................... 715/763 |
| 6,883,137 B1 | 4/2005 | Girardot et al. ............... 715/513 |
| 6,889,260 B1 | 5/2005 | Hughes |
| 6,898,604 B1 | 5/2005 | Ballinger et al. |
| 6,901,402 B1 | 5/2005 | Corston-Oliver et al. |
| 6,901,403 B1 | 5/2005 | Bata et al. |
| 6,904,560 B1 | 6/2005 | Panda |
| 6,925,457 B2 | 8/2005 | Britton et al. ..................... 707/1 |
| 6,925,470 B1 | 8/2005 | Sangudi et al. ............... 707/102 |
| 6,944,857 B1 | 9/2005 | Glaser et al. ................... 717/173 |
| 6,948,133 B2 | 9/2005 | Haley ............................ 715/780 |
| 6,950,831 B2 | 9/2005 | Haley |
| 6,950,982 B1 | 9/2005 | Dourish ......................... 715/512 |
| 6,957,385 B2 | 10/2005 | Chan et al. ..................... 715/504 |
| 6,963,867 B2 | 11/2005 | Ford |
| 6,964,010 B1 | 11/2005 | Sharp |
| 6,964,053 B2 | 11/2005 | Ho et al. |
| 6,968,346 B2 | 11/2005 | Hekmatpour |
| 6,975,983 B1 | 12/2005 | Fortescue |
| 6,976,090 B2 | 12/2005 | Ben-Shaul et al. ............ 709/246 |
| 6,976,209 B1 | 12/2005 | Storisteanu et al. ........... 715/512 |
| 6,981,212 B1 | 12/2005 | Claussen et al. |
| 6,986,104 B2 | 1/2006 | Green et al. ................... 715/523 |
| 6,990,654 B2 | 1/2006 | Carroll, Jr. |
| 7,003,522 B1 | 2/2006 | Renar et al. |
| 7,003,560 B1 | 2/2006 | Mullen et al. |
| 7,013,289 B2 | 3/2006 | Horn et al. ....................... 705/26 |
| 7,013,303 B2 | 3/2006 | Faybishenko et al. |
| 7,017,046 B2 | 3/2006 | Doyle et al. |
| 7,017,175 B2 | 3/2006 | Alao et al. |
| 7,024,658 B1 | 4/2006 | Cohen et al. |
| 7,028,312 B1 | 4/2006 | Merrick et al. |
| 7,032,174 B2 | 4/2006 | Montero et al. |
| 7,039,859 B1 | 5/2006 | Sundaresan |
| 7,051,076 B2 | 5/2006 | Tsuchiya ....................... 709/206 |
| 7,082,392 B1 | 7/2006 | Butler et al. ................... 704/233 |
| 7,100,115 B1 | 8/2006 | Yennaco |
| 7,111,077 B1 | 9/2006 | Starkovich et al. |
| 7,113,976 B2 | 9/2006 | Watanabe ...................... 709/206 |
| 7,209,915 B1 | 4/2007 | Taboada et al. .................... 707/3 |
| 7,216,351 B1 | 5/2007 | Maes |
| 7,237,190 B2 | 6/2007 | Rollins et al. |
| 7,281,245 B2 | 10/2007 | Reynar et al. |
| 7,296,230 B2 * | 11/2007 | Fukatsu et al. ................ 715/711 |
| 7,302,634 B2 | 11/2007 | Lucovsky et al. |
| 7,325,194 B2 | 1/2008 | Moore et al. |
| 7,356,537 B2 | 4/2008 | Reynar et al. |
| 7,356,615 B2 | 4/2008 | Cai et al. |
| 7,392,479 B2 | 6/2008 | Jones et al. |
| 7,421,645 B2 | 9/2008 | Reynar |
| 7,454,459 B1 | 11/2008 | Kapoor et al. |
| 2001/0016880 A1 | 8/2001 | Cai et al. |
| 2001/0029605 A1 | 10/2001 | Forbes et al. ................. 717/170 |
| 2001/0041328 A1 | 11/2001 | Fisher ............................ 434/157 |
| 2001/0042098 A1 | 11/2001 | Gupta et al. ................... 709/206 |
| 2001/0049676 A1 | 12/2001 | Kepler et al. |
| 2001/0049702 A1 | 12/2001 | Najmi |
| 2001/0056461 A1 | 12/2001 | Kampe et al. ................. 709/201 |
| 2002/0002590 A1 | 1/2002 | King et al. ..................... 709/206 |
| 2002/0003469 A1 | 1/2002 | Gupta |
| 2002/0003898 A1 | 1/2002 | Wu ................................ 382/187 |
| 2002/0004803 A1 | 1/2002 | Serebrennikov ............... 715/513 |
| 2002/0007309 A1 | 1/2002 | Reynar ............................ 705/14 |
| 2002/0023113 A1 | 2/2002 | Hsing et al. ................... 707/513 |
| 2002/0023136 A1 | 2/2002 | Silver et al. ................... 709/206 |
| 2002/0026450 A1 | 2/2002 | Kuramochi ................. 707/104.1 |
| 2002/0029304 A1 | 3/2002 | Reynar et al. ................. 719/332 |
| 2002/0032775 A1 | 3/2002 | Venkataramaiah et al. |
| 2002/0035581 A1 | 3/2002 | Reynar et al. ................. 715/513 |
| 2002/0038180 A1 | 3/2002 | Bellesfield et al. |
| 2002/0065110 A1 | 5/2002 | Enns et al. ..................... 455/566 |
| 2002/0065891 A1 | 5/2002 | Malik ............................ 709/206 |
| 2002/0066073 A1 | 5/2002 | Lienhard et al. .............. 717/105 |
| 2002/0078222 A1 | 6/2002 | Compas et al. ................ 709/232 |
| 2002/0087591 A1 | 7/2002 | Reynar et al. |
| 2002/0091803 A1 | 7/2002 | Imamura et al. ............... 709/220 |
| 2002/0099687 A1 | 7/2002 | Krishnaprasad et al. |
| 2002/0100036 A1 | 7/2002 | Moshir et al. ................. 717/173 |
| 2002/0103794 A1 | 8/2002 | Chang |
| 2002/0103829 A1 | 8/2002 | Manning et al. .............. 715/513 |
| 2002/0104080 A1 | 8/2002 | Woodard et al. .............. 717/176 |
| 2002/0107735 A1 | 8/2002 | Henkin et al. |
| 2002/0110225 A1 | 8/2002 | Cullis ............................ 379/67.1 |
| 2002/0120685 A1 | 8/2002 | Srivastava et al. ............. 709/203 |
| 2002/0129107 A1 | 9/2002 | Loughran et al. .............. 709/206 |
| 2002/0133523 A1 | 9/2002 | Ambler et al. ................ 707/536 |
| 2002/0149601 A1 | 10/2002 | Rajarajan et al. .............. 345/619 |

| | | | |
|---|---|---|---|
| 2002/0156774 A1 | 10/2002 | Beauregard et al. | |
| 2002/0156792 A1 | 10/2002 | Gombocz et al. | 707/100 |
| 2002/0156929 A1 | 10/2002 | Hekmatpour | |
| 2002/0169802 A1 | 11/2002 | Brewer et al. | 707/513 |
| 2002/0175955 A1 | 11/2002 | Gourdol et al. | |
| 2002/0178008 A1 | 11/2002 | Reynar | 704/272 |
| 2002/0178182 A1 | 11/2002 | Wang et al. | 715/501.1 |
| 2002/0184247 A1 | 12/2002 | Jokela et al. | 707/204 |
| 2002/0188637 A1* | 12/2002 | Bailey et al. | 707/530 |
| 2002/0188941 A1 | 12/2002 | Cicciarelli et al. | 717/175 |
| 2002/0194166 A1 | 12/2002 | Fowler | |
| 2002/0196281 A1 | 12/2002 | Audleman et al. | 715/762 |
| 2002/0198909 A1 | 12/2002 | Huynh et al. | 707/513 |
| 2003/0002391 A1 | 1/2003 | Biggs | 368/82 |
| 2003/0004937 A1 | 1/2003 | Salmenkaita et al. | |
| 2003/0005411 A1 | 1/2003 | Gerken | 717/120 |
| 2003/0009489 A1 | 1/2003 | Griffin | 707/500 |
| 2003/0014745 A1 | 1/2003 | Mah et al. | 717/170 |
| 2003/0025728 A1 | 2/2003 | Ebbo et al. | 715/744 |
| 2003/0030672 A1 | 2/2003 | Hughes et al. | |
| 2003/0046316 A1 | 3/2003 | Gergic et al. | |
| 2003/0050911 A1 | 3/2003 | Lucovsky et al. | |
| 2003/0050924 A1 | 3/2003 | Faybishenko et al. | |
| 2003/0051236 A1 | 3/2003 | Pace et al. | 717/177 |
| 2003/0055818 A1 | 3/2003 | Faybishenko et al. | |
| 2003/0056207 A1 | 3/2003 | Fischer et al. | 717/174 |
| 2003/0081791 A1 | 5/2003 | Erickson et al. | 380/282 |
| 2003/0083910 A1 | 5/2003 | Sayal et al. | 705/7 |
| 2003/0084138 A1 | 5/2003 | Tavis et al. | 709/223 |
| 2003/0088544 A1 | 5/2003 | Kan et al. | |
| 2003/0097318 A1 | 5/2003 | Yu et al. | 705/35 |
| 2003/0101190 A1 | 5/2003 | Horvitz et al. | |
| 2003/0101204 A1 | 5/2003 | Watson | 708/206 |
| 2003/0101416 A1 | 5/2003 | McInnes et al. | 715/513 |
| 2003/0105806 A1 | 6/2003 | Gayle et al. | |
| 2003/0106040 A1 | 6/2003 | Rubin et al. | 717/106 |
| 2003/0115039 A1 | 6/2003 | Wang | 704/4 |
| 2003/0121033 A1 | 6/2003 | Peev et al. | 717/175 |
| 2003/0126120 A1 | 7/2003 | Faybishenko et al. | |
| 2003/0126136 A1 | 7/2003 | Omoigui | 707/10 |
| 2003/0140308 A1 | 7/2003 | Murthy et al. | 715/500 |
| 2003/0154144 A1 | 8/2003 | Pokorny et al. | 705/28 |
| 2003/0158841 A1 | 8/2003 | Britton et al. | 707/3 |
| 2003/0158851 A1 | 8/2003 | Britton et al. | 707/100 |
| 2003/0167445 A1 | 9/2003 | Su et al. | |
| 2003/0172343 A1 | 9/2003 | Leymaster et al. | 715/500 |
| 2003/0176995 A1 | 9/2003 | Sukehiro | |
| 2003/0177341 A1 | 9/2003 | Devillers | |
| 2003/0182258 A1 | 9/2003 | Sakamoto et al. | |
| 2003/0182391 A1 | 9/2003 | Leber et al. | |
| 2003/0192040 A1 | 10/2003 | Vaughan | 717/173 |
| 2003/0195871 A1 | 10/2003 | Luo et al. | |
| 2003/0195937 A1 | 10/2003 | Kircher et al. | 709/207 |
| 2003/0212527 A1 | 11/2003 | Moore et al. | 702/179 |
| 2003/0220795 A1 | 11/2003 | Arayasantiparb et al. | 704/275 |
| 2003/0220913 A1 | 11/2003 | Doganata et al. | |
| 2003/0229593 A1 | 12/2003 | Raley et al. | 705/55 |
| 2003/0233330 A1 | 12/2003 | Raley et al. | 705/55 |
| 2003/0237049 A1 | 12/2003 | Sawicki et al. | |
| 2004/0002939 A1 | 1/2004 | Arora et al. | |
| 2004/0003389 A1 | 1/2004 | Reynar et al. | 717/178 |
| 2004/0006564 A1 | 1/2004 | Lucovsky et al. | |
| 2004/0006741 A1 | 1/2004 | Radja et al. | 715/513 |
| 2004/0024875 A1 | 2/2004 | Horvitz et al. | |
| 2004/0039990 A1 | 2/2004 | Bakar et al. | |
| 2004/0044959 A1 | 3/2004 | Shanmugasundaram et al. | |
| 2004/0068694 A1 | 4/2004 | Kaler et al. | |
| 2004/0075697 A1* | 4/2004 | Maudlin | 345/848 |
| 2004/0083218 A1 | 4/2004 | Feng | |
| 2004/0133846 A1 | 7/2004 | Khoshatefeh et al. | 715/500 |
| 2004/0143581 A1 | 7/2004 | Bohannon et al. | |
| 2004/0162833 A1 | 8/2004 | Jones et al. | |
| 2004/0165007 A1 | 8/2004 | Shafron | 345/781 |
| 2004/0172584 A1 | 9/2004 | Jones et al. | |
| 2004/0199861 A1 | 10/2004 | Lucovsky | 715/500 |
| 2004/0201867 A1 | 10/2004 | Katano | 358/1.15 |
| 2004/0230666 A1 | 11/2004 | Taboada et al. | |
| 2004/0236717 A1 | 11/2004 | Demartini et al. | 707/1 |
| 2004/0243575 A1 | 12/2004 | Ohashi | |
| 2005/0050164 A1 | 3/2005 | Burd et al. | 709/217 |
| 2005/0055330 A1 | 3/2005 | Britton et al. | 707/1 |
| 2005/0094850 A1 | 5/2005 | Nakao | 382/103 |
| 2005/0108195 A1 | 5/2005 | Yalovsky et al. | |
| 2005/0120313 A1 | 6/2005 | Rudd et al. | 715/866 |
| 2005/0155017 A1 | 7/2005 | Berstis et al. | |
| 2005/0182617 A1 | 8/2005 | Reynar et al. | |
| 2005/0187926 A1 | 8/2005 | Britton et al. | 707/3 |
| 2005/0193335 A1* | 9/2005 | Dorai et al. | 715/530 |
| 2005/0278309 A1 | 12/2005 | Evans et al. | 707/3 |
| 2006/0026170 A1* | 2/2006 | Kreitler et al. | 707/10 |
| 2006/0101005 A1 | 5/2006 | Yang et al. | 707/3 |
| 2006/0173674 A1 | 8/2006 | Nakajima et al. | |
| 2007/0005702 A1 | 1/2007 | Tokuda et al. | 709/206 |
| 2007/0073652 A1 | 3/2007 | Taboada et al. | |
| 2007/0136261 A1 | 6/2007 | Taboada et al. | |
| 2008/0021886 A1 | 1/2008 | Wang-Aryattanwanich et al. | |
| 2008/0046812 A1 | 2/2008 | Reynar et al. | |

FOREIGN PATENT DOCUMENTS

| | | |
|---|---|---|
| CN | 100429655 C | 10/2008 |
| CN | ZL 200410005390.8 | 10/2008 |
| EP | 0364180 A2 | 4/1990 |
| EP | 0481784 A2 | 4/1992 |
| EP | 0598511 A2 | 5/1994 |
| EP | 0872827 A2 | 10/1998 |
| EP | 0810520 B1 | 12/1998 |
| EP | 1093058 A1 | 4/2001 |
| EP | 1280068 A2 | 1/2003 |
| EP | 1361523 A2 | 11/2003 |
| EP | 1376392 A2 | 1/2004 |
| EP | 1447754 A1 | 8/2004 |
| EP | 1 452 966 A3 | 9/2004 |
| JP | 64-0088771 A | 4/1989 |
| JP | 05-174013 | 7/1993 |
| JP | 08-272662 | 10/1996 |
| JP | 09-138636 | 5/1997 |
| JP | 2000-222394 | 8/2000 |
| JP | 2000-231566 | 8/2000 |
| JP | 2001-014303 | 1/2001 |
| JP | 2001-125994 | 5/2001 |
| JP | 2001-522112 | 11/2001 |
| JP | 2002-041353 | 2/2002 |
| JP | 2002163250 A | 6/2002 |
| JP | 2002-222181 | 8/2002 |
| WO | WO 95/07510 A1 | 3/1995 |
| WO | WO 99/17240 A1 | 4/1999 |
| WO | WO 00/54174 A1 | 9/2000 |
| WO | WO 00/67117 A2 | 11/2000 |
| WO | WO 00/73949 A1 | 12/2000 |
| WO | WO 01/18687 A1 | 3/2001 |
| WO | WO 01/37170 A2 | 5/2001 |
| WO | WO 00/186390 A2 | 11/2001 |
| WO | WO 02/99627 A1 | 1/2002 |
| WO | WO 02/15518 A2 | 2/2002 |
| WO | WO 02/42928 A1 | 5/2002 |
| WO | WO 2004/012099 A2 | 2/2004 |

OTHER PUBLICATIONS

TwinBridge Software Corporation, "TransWhiz English/Chinese Bi-directional Translation V9.0 Standard," Date: Mar. 1, 2007, pp. 1-8, http://www.twinbridge.com/detail.aspx?ID=132.

InteractiveTran™ Interactive Machine Translation, "Interactive Translation and Learning Tool," Date: Mar. 1, 2007, pp. 1-7, http://www.tranexp.com/win/InteractiveTran.htm.

Multilingual Books, "Word Translator for Windows," Date: Mar. 1, 2007, pp. 1-4, http://www.multilingualbooks.com/wordtranslator.html.

"The Spatial Smart Tag," Geomatic Technologies, Mar. 10, 2005, 2 pp.

"XML Schema Part 2: Datatypes," W3C, May 2, 2001, http://www.w3.org/TR/2001/REC-xmlschema-2-20010502/, pp. 147.

C. Heinemann, "Cross-Reference your XML Data," Microsoft Corporation, Dec. 7, 1998, 6 pgs.

Camarda, B., Special Editing Using® Microsoft® Office Word 2003, Que, Dec. 12, 2003, pp. 1-5.

D. Obasanjo, "XML_Namespaces and How They Affect Xpath and XSLT," Microsoft Corporation, May 20, 2002, 19 pgs.

Dong-Guk Shin and Lung-Yung Chu, Establishing Logical Connectivity between Query Keywords and Database Contents, Advances in Artificial Intelligence, 12th Biennial Conference of the Canadian Society for Computational Studies of Intelligence, AI'98, Vancouver, BC, Canada, Jun. 18-20, 1998, Proceedings, p. 45-59.

Doroth, V. et al., "Modern Computer Vocabulary," St. Petersburg, BHV-Peterburg, 2001, p. 465 (with English language translation).

European Communication Minutes of Oral Proceedings and Decision dated Sep. 15, 2008 in European Application No. 05 000 506.5-1527.

European Communication Summons to Attend Oral Proceedings dated May 7, 2008.

Frye, C., Microsoft Office Systems: Step by Step, Microsoft Press, 2003 Edition, Sep. 3, 2003, pp. 1-6.

Ghamrawi et al., "Collective Multi-Label Classification," ACM, 2005, pp. 195-200.

Harmon, D., "Microsoft MapPoint 2002," Geoworld Quick-Take Reviews, Aug. 2001, 3 pp.

Ho-Chuan Huang, Jon Kerridge, and Shang-Liang Chen, A Query Mediation Approach to Interoperability of Heterogeneous Databases, Australian Computer Science Communications, vol. 22, No. 2, (1999), p. 41-48.

IEEE 100 The Authoritative Dictionary of IEEE Standards Terms, 2000, IEEE Press, 7th Edition, p. 795.

Irie R. et al., "Resources for Place Name Analysis," May 28, 2004, 4 pp.

Ivens, K., Office XP Smart Tags, Microsoft, Mar. 6, 2002, pp. 1-4.

Jaap C. Hage, Maarten van der Meulen, and Georges Span, Intelligent Information Retrieval from Multiple Databases, Informatica e Diritto, vol. 2, No. 2, (1993), p. 149-164.

Koyaku, H., "What is Brought to SQL Server 2000 by XML, Part 1: Function of XML Provided by SQL Server 2000," Enterprise Servers World, vol. 3, No. 12, IDG Japan, Inc., Dec. 1, 2000, pp. 42-53.

Lewis, David D. et al., "A Sequential Algorithm for Training Text Classifiers," Spring-Verlag New York, Inc., 1994, pp. 1-10.

M. Stowe, "XML in Excel and the Spreadsheet Component," Microsoft Corporation, Aug. 2001, 6 pgs.

Microsoft Press Computer Dictionary, 1997, Microsoft Press, 3rd Edition, p. 355.

Oviatt et al., "Integration and Synchronization of Input Modes during Multimodal Human-Computer Interaction," CHI 97, Atlanta, Georgia, Mar. 22-27, 1997, pp. 415-422.

Pershikov, V.I., "Explanatory Dictionary in Informatics," Finances and Statistics, Moscow, 1991 (in Russian with translated sections) 5 pgs.

Pixley, "Document Object Model (DOM) Level 2 Events Specification Version 1.0," World Wide Web Consortium, Nov. 13, 2000, www.w3.org/TR/2000/REC-DOM-Level-2-Events-20001113/DOM2-Events.pdf.

Rajabifard, A. et al., "Creating an Enabling Platform for the Delivery of Spatial Information," Spatial Sciences Institute Biennial Conference, Sep. 12, 2005, 10 pp.

Rubin, Charles, "Microsoft Word 2000 Official Manual," First Edition, Nikkei BP Soft Press, Inc., Aug. 2, 1999, pp. 215-217.

Susan Gauch, Jianying Wang, and Satya Mahesh Rachakonda—University of Kansas, A Corpus Analysis Approach for Automatic Query Expansion and Its extension to Multiple Databases, ACM Transactions on Information Systems, vol. 17, No. 3, (Jul. 1999), p. 250-269.

Wei Ying-bin et al., "A New Technology ColdFusion of Realizing Dynamic Webpage," 2000, 6 pgs. (English language translation, pp. 1-6).

Yigal Arens, Chin Y. Chee, Chun-Nan Hsu and Craig A Knoblock, Retrieving and Integrating Data from Multiple Information Sources, International Journal of Intelligent and Cooperative Information Systems, vol. 2, No. 2 (1993), p. 127-158.

U.S. Final Office Action dated Aug. 1, 2008 in U.S. Appl. No. 11/234,968.

U.S. Official Action dated Feb. 3, 2009 cited in U.S. Appl. No. 11/234,968.

Hara, T. et al., "Inside Microsoft.NET—Complete Explanation, 'What Microsoft Aims For'", msdn magazine, No. 6, pp. 20-35, ASCII, Japan, Sep. 18, 2000, 19 pp.

Koyaku, H., "What is Brought to SQL Server 2000 by XML, Part 1: Function of XML Provided by SQL Server 2000", Enterprise Servers World, vol. 3, No. 12, IDG Japan, Inc., Dec. 1, 2000, pp. 42-53 (with English language translation).

Shiroiwa, K., "iMac&iBook, Must-see for User, Full of Recommended Setting Methods and Specially Selected Tips, Mastering Mac OS9", MacPeople, ASCII Corporation, Japan, Dec. 3, 1999, vol. 5, No. 24, p. 50 (in Japanese—no translation yet).

Mexican Official Action dated Feb. 11, 2009.

Chinese Final Rejection dated Mar. 13, 2009.

Japanese Final Rejection dated Mar. 17, 2009.

Japanese Final Rejection dated Apr. 3, 2009.

Goldfarb, C. XML Handbook, $1^{st}$ Ed., Pearson Education, Japan, May 10, 1999, pp. 246-254 (no English translation).

Tanaka, S., "Verifying the XML Schema Definition," *XML Magazine*, Shoeisha Co., Ltd., vol. 10, No. 3, Jul. 1, 2000, pp. 135-155 (no English translation).

Rees, M., "User Interfaces for Lightweight In-line Editing of Web Pages," *IEEE*, 7 pages (2000).

U.S. Office Action dated Apr. 20, 2009.

U.S. Office Action dated Apr. 27, 2009.

Santos, C.A.S., L.F.G Soares, G.L. de Souza and J.P. Courtiat; *Design methodology and formal validation of hypermedia documents*; Proceedings of the sixth ACM international conference on multimedia, (1998) p. 39-48.

Terveen, Loren, Will Hill and Brian Amento; *Constructing, organizing, and visualizing collections of tropically related Web resources*; ACM Trans. Comput.-um. Interact. 6, 1 (Mar. 1999) p. 67-94.

Barrett, Rob, Paul P. Maglio and Daniel C. Kellem; *How to personalize the Web*; Conference proceedings on human factors in computing systems (1997) p. 75-82.

Marx, Matthew and Chris Schmandt; *CLUES: dynamic personalized message filtering*; Proceedings of the ACM 1996 conference on computer supported cooperative work (1996) p. 113-121.

Goschka, Karl M. And Jurgen Falb; *Dynamic hyperlink generation for navigation in relational databases*; Proceedings of the tenth ACM conference on hypertext and hypermedia: returning to our diverse roots (1999) p. 23-24.

Pentland, Alex; *Perceptual user interfaces: perceptual intelligence*; Commun. ACM 43, 3 (Mar. 2000) p. 35-44.

Stairmand, Mark A.; *Textual context analysis for information retrieval*; Proceedings of the 20th annual international ACM SIGIR conference on research and development in information retrieval (1997) p. 140-147.

Glushko, Robert J., Jay M. Tenenbaum and Bart Meltzer; *An XML framework for agent-based E-commerce*; Commun. ACM 42, 3 (Mar. 1999) p. 106.

Kukich, Karen; *Techniques for Automatically Correcting Words in Text*; ACM Comput. Surv., 24, 4 (Dec. 1992); pp. 377-439.

Marx, Matt and Chris Schmandt; *Putting People First: Specifying Proper Names in Speech Interfaces*; Proceedings of the ACM Symposium on User Interface Software and Technology; 1994; pp. 29-37.

Ford, Bryan, Mike Hibler, Jay Lepreau, Roland McGrath and Patrick Tullman; *Interface and execution models in the fluke kernel*; Proceedings of the third symposium on operating systems and implementation, (1999) p. 101-115.

Desmarais, Michel C. and Jiming Liu; *Exploring the applications of user-expertise assessment for intelligent interfaces*; Proceedings of the conference on human factors in computing systems, (1993) p. 308-313.

Foley, James D.; *Future directions in user-computer interface software*; Conference proceedings on organizational computer systems, (1991) p. 289-297.

Hartson, H. Rex and Deborah Hix; *Human-computer interface development: concepts and systems for its management*; ACM Comput. Surv. 1 (Mar. 1989) p. 5-92.

Foley, Jim. *Integrating computer technology, people technology and application technology; strategies and case studies from Georgia Tech's Graphics, Visualization and Usability Center*; Proceedings of the workshop on advanced visual interfaces, (1994) p. 34-43.

Tsai, M., P. Reiher and G.J. Popek; *Command management system for next-generation user input.* Proceedings of the seventh workshop on hottopics in operating systems, (1999) p. 179-84.

*Microsoft Computer Dictionary*, Microsoft, Microsoft Press, Fifth Edition, p. 409.

Kuenning, Geoff, "Using ISPELL from Emacs", http://theochem.ki.ku.dk/on_line_docs/ispell/ispell_1.html, 4 pp., publication date unknown.

"Spellout Command", Commands Reference, vol. 5, http://www.rz.uni-hohenheim.de/betriebssysteme/unix/aix/aix_4.3.3_doc/base_doc/usr/share/man/inf . . . , 1 page, publication date unknown.

"Chapter 8—Standard Input and Output", http://www.complancs.ac.uk/computing/users/eiamjw/unix/chap8.html, 3 pp., publication date unknown.

Panagiotis, Christias, Man-cgi 1.15, http://www.physics.umn.edu/cgi-bin/man-cgi?spell, 1994, 5 pp.

Bischof, Hans-Peter, "Spell, Spellin, Spellout—Finding Spelling Errors", http://www.vorlesungen.uni-osnabrueck.de/informatik/shellscript/Html/Man/_Man_NeXT_html/html . . . , Apr. 21, 1997, 2 pp.

"Module 123—Spell", http://duplex.hypermart.net/books/bsd/501-504.html, 4 pp., publication date unknown.

Panagiotis, Christias, Man-cgi 1.15, http://www.calpoly.edu/cgi-bin/man-cgi?spell+1, 1994, 3 pp.

Martensson, Bengt, "Thread-Enhanced Spell Front End for GNU Emacs + Detex + Delatex", http://www.geocrawler.com/archives/3/337/1987/8/0/1871981/, Aug. 20, 1987, 1 page.

Willisson, Pace, Ispell (1), http://www.rt.com/man/findaffix.1.html, 1983, 15 pp.

Willisson, Pace, Ispell (1), "User Commands", http://www.csee.usf.edu/cgi-bin/man-cgi?ispell, 1983, 18 pp.

"Handout 38: Spell Checking, Word Counting, and Textual Analysis", http://courses.cs.emporia.edu/pheattch/courses/2002/cs501s02/hand38/, 3 pp., publication date unknown.

Kuenning, Geoff, "International Ispell", http://fmg-www.cs.ucla.edu/geoff.ispell.html, 3 pp., publication date unknown.

Ispell 4, "Ispell—Format of Ispell Dictionaries and Affix Files", http://www.bigbiz.com/cgi-bin/manpage?4+ispell, 11 pp., publication date unknown.

McMahon, Lee. E., "SED—A Non-Interactive Text Editor," Bell Laboratories, Murray Hill, New Jersey 07974, Aug. 15, 1978, pp. 16.

Beitner, N.D.; Hall, W.; Goble, C.A., "Multimedia Support and Authoring in Microcosm: An Extended Model," Dept. of Electronics and Computer Science, Univ. of Southampton, Southampton SO17 1BJ, UK; Dept. of Computer Science, Univ. of Manchester, Oxford Road, Manchester MI3 9PL, UK, pp. 1-12, publication date unknown.

IBM Corporation, "IBM Research Disclosure #368; Multimedia Hyperlinks Automatically Created For Reference Documents," *IBM Technical Disclosure Bulletin,* Jun. 1993, pp. 1-5.

The Complete LINUX™ Operating System 5.2 Deluxe, Red Hat,® Macmillian Digital Publishing USA, A Viacom Company, Red Hat Software, Inc., ISBN 1-57595-199-1B, 1995-1998, pp. 1-385.

*User Manual for AddressMate and AddressMate Plus*, CoStar Corporation, AddressMate Software, 1994-1995, pp. 1-210.

Getting Results With Microsoft® Office 97, *Real World Solutions for the Work You Do*, Microsoft Corporation, 1995-1997, pp. 1-703.

*InfoCentral™ 7*, User's Manual, Corel Corporation, vol. 1, Version 7.0, 1996, pp. 1-86.

Corel® Office Professional 7 Quick Results User's Manual, vol. 1, Version 7.0 (first printing), Corel Corporation, Limited, pp. 1-531, publication date unknown.

Novell GroupWise User's Guide for Windows 16-Bit Version 5.2, Novell, Inc., 1993-1997, pp. 1-231.

Novell GroupWise User's Guide for Windows 32-Bit Version 5.2, Novell, Inc., 1998, pp. 1-318.

Claris Em@iler Getting Started User's Guide, For Macintosh, Claris Corporation, 1995-1997, 61 pp.

Developer's Guide To Apple Data Detectors, For Version 1.0.2., Apple Computer, Inc., 1997, pp. 1-33.

Apple Data Detectors User's Manual, Apple Computer, Inc., 1997, pp. 1-15.

Nardi, Bonnie A.; Miller, James R.; Wright, David J., "Collaborative, Programmable Intelligent Agents," Jim Miller/Miramontes Computing, Apple Computer Advanced Technology Group, http://www.miramontes.com/writing/add-cacm/add-cacm/html, Mar. 1998, pp. 1-11.

Hewkin, "Smart Tags-the Distributed-Memory Revolution", IEE Review, Jun. 22, 1989, pp. 203-206.

Measuring Units Conversion Table-http://web.archie.org-1997 Internet French Property, pp. 1-4.

IBM Technical Disclosure Bulletin, "National Language Support Enablemetn for Culture-Specific Operations", Nov. 1, 1993, vol. 36, Issue 11, pp. 629-638.

Towers, J. Tarin, Visual Quickstart Guide: Dreamweaver 2 for Windows and Macintosh, 1999, Peachpit Press, pp. 150-151.

Driza, Scott, "Learn Word 2000 VBA Document Automation", Wordware Publishing Inc., 2001, 6 pp.

Cornell, Paul, "Developing Smart Tag DLLs", MSDN Library, http://msdn.microsoft.com/library/default.asp?url=/library/en-us/dnsmarttag/html/odc_smarttags.asp, Apr. 2001, pp. 8.

Menu Customizing, IBM Technical Disclosure Bulletin, vol. 34, No. 1, Jun. 1991, pp. 91-92 (4 pp. total).

Perry, Brad, et al., "Discovering Similar Resources by Content Part-Linking", Proceedings of the Sixth International Conference on Information and Knowledge Management, published by ACM Press 1997, pp. 317-324.

Schulz, Charles, "Writing Applications for Uniform Operation on a Mainframe or PC: A Metric Conversion Program", Lockheed Missles & Space Company, Inc., Sunnyvale, CA, May 1990, pp. 348-361.

Devanbue, P. et al., "Chime: customizable hyperlink insertion and maintenance engine for software engineering environments", Software Engineering, Publication date: 1999, ISBN: 1-58113-07400.

"Using Flyswat", http://www.flywsat.com/using.html, download date: Sep. 28, 1999, 1 pp.

"What is Flyswat", http://www.flyswat.com, download date: Sep. 28, 1999, 5 pp.

"Intelligent Text Processing: About", http://www.syntalex.co.uk/about/about.html, download date: Aug. 7, 1999, 1 pp.

"Intelligent Text Processing: Automatic Cross-Referencing", http://www.syntalex.co.uk/services/acrl.html, download date Aug. 7, 1999, 3 pp.

"Intelligent Text Processing: Case Study: Context", http://www.syntalex.co.uk/casestudies/context.html, download date: Aug. 7, 1999, 3 pp.

"Integrating with External Systems: iPlanet™ Unified Development Server", Sun Microsystems, Inc., Ver. 5.0, Aug. 2001, pp. 127-156.

Sperberg-McQueen, C.M. and Thompson, Henry, "XML Schema", W3C Architecture Domain, http://web.archive.org/web/20020802155904/http://www.w3.org/XMLSchema, 2000-2002, pp. 1-10.

Quin, Liam, "Extensible Markup Language (XML)", W3C Architecture Domain, http://web.archive.org/web/2002121962057/http://www.w3.org/XML/, 1996-2002, pp. 1-3.

Clark, James, and DeRose, Steve, "XML Path Language (XPath), Version 1.0", W3C, http://web.archive.org/web/2021010034434/http://www.w3.org/TR/xpath, 1999-2000, pp. 1-31.

"Microsoft BizTalk Server 2002—Using BizTalk Mapper", http://msdn.Microsoft.com/library/en-us/bts_2002/htm/lat_xmltools_map_intro_zkqb.asp . . . , Microsoft Corporation, 1999-2001, pp. 1-2.

"BizTalk Server 2002 Mapper User Interface", http://msdn.microsoft.com/library/en-us/bts_2002/htm/lat_xmltools_map_concept_codw . . . , Microsoft Corporation, 1999-2001, pp. 1.

"BizTalk Server 2002 Compiling Maps", http://msdn.microsoft.com/library/en-us/bts_2002/htm/lat_xmltools_map_concept_drgl.a . . . , Microsoft Corporation, 1999-2001, pp. 1.

"BizTalk Server 2002 Testing Maps", http://msdn.microsoft.com/library/en-us/bts_2002/htm/lat_xmltools_map_concept_fhhy.a . . . , Microsoft Corporation, 1999-2001, pp. 1-2.

"BizTalk Server 2002 View Links and Functoids by Using Grid Preview", http://msdn.microsoft.com/library/en-us/bts_2002/htm/lat_xmltools_map_check_fuwn.as . . . , Microsoft Corporation, 1999-2001, pp. 1.

"The StarOffice™ 6.0 Suite: New Features Guide", Sun Microsystems, V. 1.1, Jul. 2002, pp. 1-31.

"New Microsoft Office Family Application Taps Power of Industry-Standard XML", http://www.microsoft.com/presspass/press/2002/oct02/10-09officefamilypr.mspx, Microsoft Corporation, Oct. 2002-Feb. 2003, pp. 1-2.

"Q&A: How 'XDocs' Alters the Paradigm for Gathering Business-Critical Information", http://www.microsoft.com/presspass/press/2002/oct02/10-09officefamily.mspx, Microsoft Corporation, Oct. 2002-Feb. 2003, pp. 1-4.

"InfoPath: Microsoft Names New Product from Office Group", http://www.microsoft.com/presspass/press/2003/feb03/02-10infopath.mspx, Microsoft Corporation, Oct. 2002-Feb. 2003, pp. 1-4.

"Microsoft Unveils Visual Studio.NET Enterprise Tools", Microsoft Corporation, http://microsoft.com/presspass/press/2001/may01/05-21vseepr.mspx, May 2001, pp. 1-4.

"Microsoft Extends XML Web Services Support in .NET Enterprise Servers Through Visual Studio .NET", http://www.microsoft.com/presspass/press/2002/feb02/02-13servervspr.mspx, Microsoft Corporation, Feb. 2002, pp. 1-3.

"How to Use XSL to Transform Excel XML Spreadsheet for Server-Side Use", http://support.microsoft.com/default.aspx?scid=kb;en-us;278976, Microsoft Corporation, Aug. 2004, pp. 1-7.

Mueller, Jennifer M., "Work Smarter with Smart Tags", Journal of Accounting—Online, vol. 194, No. 5, Nov. 2002, http://www.aicpa.org/pubs/jofa/nov2002/Mueller.htm>, retrieved on Apr. 22, 2005.

Fernandez M. et al., "SilkRoute: trading between relations and XML", Computer Networks, vol. 33, No. 1-6, Jun. 2000, pp. 723-745.

Braganholo V., "Updating Relational Databases Through XML Views", Technical Report, Sep. 2002, pp. 1-61.

Falquet G. et al., "Design and Analysis of Active Hypertext Views on Databases", Information Sciences Institute, Jan. 2002, pp. 1-24.

Ceri S. et al., "Deriving Production Rules for Incremental View Maintenance", Proceedings of the 17th International Conference on Very Large Data Bases, Sep. 1991, pp. 577-589.

Bonifati A., "Active Behaviors within XML Document Management", EDBT Ph. D. Workshop, Mar. 2000, pp. 1-4.

"Integrated Development Enviorment (IDE)", http://web.archive.org/web/20020602032242/http:altova.com/products_ide.html, Jun. 2002, pp. 1-2.

"Altova markup your mind!" http://web.archive.org/web/20021204211721/http://altova.com/products_ide.html, Dec. 2002, pp. 1-3.

Arbortext, "Arbortext and Accessibilty", http://web.archive.org/web/20021219133536/www.arbortext.com/html/accessibility.html, Dec. 2002, pp. 1-5.

Arbortext, "XML Compliance, 100% Pure XML", http:web.archive.org/web/20021209185855/www.arbortext.com/html/xml_compliance, Dec. 2002, pp. 1-3.

Arbortext, "Schemas", http://web.archive.org/web/20021221023148/www.arbortext.com/html/schemas.html, Dec. 2002, pp. 1-3.

Arbortext, "Arbortext's Support for XSL-FO", http://web.archive.org/web/20021221021632/www.arbortext.com/html/xsl-fo.html. Dec. 2002, pp. 1-4.

Corel, "Corel XMetal4, Making XML Content Creation Easy", http://web.archive.org/web/20031118215158/www.corel.com/servlet/Satellite?pagename, Nov. 2003, pp. 1-2.

Corel, "Corel XMetal 4 and Interwoven TeamXML", http://web.archive.org/web/20030807211225/www.corel.com/futuretense_cs/ccurl/corel+xml+4++and+interwoven+teamxml.pdf, Aug. 2003, pp. 1-2.

Corel, "The Corel-XyEnterprise XML Solution", http://web.archive.org/web/20030807154355/www.corel.com/futuretense_cs/ccurl/corel+and+XY+enterprise+XML+solution.pdf, Aug. 2003, pp. 1-2.

Brooks-Bilson, "Programming ColdFusion" [electronic resource] 2001, Safari Tech Books Online, 1st Edition, 25 pp.

Wilker, John, "ColdFusion MX Adds J2EE, XML, and Web Services Compatibility", Aug. 9, 2002, http://builder.com/5102-6387-104585.html, 3 pp.

Homer, Alex et al., Professional Active Services Pages, 1997, Wrox Press Ltd., Section"Client-Side Scripting and Components", subsection "Choosing Your Applets, and Controls", 16 pp.

Flanagan, D., "JavaScript—The Definitive Guide, Fourth Edition", Jan. 2002, O'Reilly, 12 pp.

Brockschmidt, K., "Inside OLE, Second Edition", 1995, Microsoft Press, p. 169.

Toth, V., "Visual C++ 4 Unleashed", 1996, Sams Publishing, p. 174.

Sriram, V., "ComponentXchange: An E-Exchange for Software Components", Master Thesis, CitSeer, May 2001, pp. i-v, 1-77.

Bosak, "XML: The Universal Publishing Format", SGML/XML Europe '98, May 1998, pp. A1-C17.

Kristensen, "Template Resolution in XML/HTML", Computer Networks and ISDN Systems, vol. 30, 1998, pp. 239-249.

Fan et al., "FormPlus: A Form Authoring Toolkit", Proceedings of the Fourteenth Annual Computer Software and Applications Conference, Oct. 31, 1990-Nov. 2, 1990, pp. 255-260.

Boone, "Concept Features in Re: Agent, An Intelligent Email Agent", Proceedings of the 2nd International Conference on Autonomous Agents, May 9-13, 1998, pp. 141-148.

Takkinen et al., "Café: A Conceptual Model for Managing Information in Electronic Mail", Proceedings of the Annual Hawaii International Conference on System Sciences, 1998, pp. 44-53.

"Smart Tags: Dumb Technology?", webreference.com, Online, Aug. 29, 2001, http://www.webreference.com/xml/column30/3.html, 3 pp.

"Being 'Smart' with Smart Tags in Office XP", Create for Mississippi, Aug. 2001, http://www.create.cett.msstate.edu/create/howto/smart_tags.pdf, 7 pp.

Harold, E.R., "XML: Extensible Markup Language", IDG Books Worldwide, Books 24x7.com printout, 1998, 20 pp.

Marais, Hannes, "Supporting Cooperative and Personal Surfing With a Desktop Assistant", 1997, ACM Press, pp. 129-138.

World Wide Web Consortium, "Document Object Model (DOM) Level 2 Events Specification, Version 1.0", http://www.w3.org/TR/2000/REC-DOM-Level-2-Events-20001113/DOM2-Events.pdf, Nov. 2000, 50 pp.

World Wide Web Consortium, "Document Object Model (DOM) Level 2 Core Specification, Version 1.0", http://www.w3.org/TR/2000/REC-DOM-Level-2-Core-20001113/DOM2-Core.pdf, Nov. 2000, 107 pp.

"Word 2002 Add in: measurement Converter Smart Tag", http://www.microsoft.com/downloads/details.aspx?FamilyID=f67fc42c-5f41-4c3f-9d5a-71354471dc32&DisplayLang=en, retrieved on Nov. 9, 2006, 2 pp.

"Microsoft Measurement Converter Smart Tag—Chinese Version", http://www.jiyang.gov/cn/laiying/My%20Pictures/%E8%B4%E5%BA%86%E8%BE%89/office2003/FILES/PFILES/COMMON/MSSHARED/SMARTTAG/CMEASURE/1033/CHMCABT.HTM, retrieved on Nov. 7, 2006, 2 pp.

Anonymous, "Adding Data from Other Sources in PowerPoint 2002," Jul. 2002, Internet article, XP-002420700, A Professional Approach Series the E-Zine Approach, http://www.glencoe.com/ps/computered/pas/article.php4?articleld-437, 8 pgs.

Rice, F.C., "Transform XML Files with XSLT When Importing into Microsoft Excel 2002," Jul. 2001, Internet article, XP-002420701, http://msdn2.microsoft.com/en-us/library/aa140055(office.10,d=printer).aspx, 9 pgs.

Johnson, L., "What's So Special About Paste Special?", Jun. 2002, Internet article, XP-002420702, http://pubs.logicalexpressions.com/Pub0009/LPMArticle.asp?ID=40, 5 pgs.

Anonymous, "Moving and Copying Text Tutorial," Aug. 17, 2001, Internet Article, XP-002307566, http://tutorials.findtutorials.com/read/category/102/id/342/p/3, 4 pgs.

Blaheta et al., "Assigning Function Tags to Parsed Text," Morgan Kaufmann Publishers Inc., 2000, pp. 234-240.

U.S. Official Action dated Oct. 29, 2007 in U.S. Appl. No. 11/234,968.

Online Dictionary Software by Babylon, http://web.archive.org/web/20030122035306/http://www3.babylon.com/, Jan. 22, 2003, 2 pages.

Babylon-Pro, http://web.archive.org/web/20021204203634/www3.babylon.com/display.php?id=14&tre . . ., Dec. 4, 2002, 4 pages.

Premium Content, http://web.archive.org/web/20031202172231/www.babylon.com/display.php?id=130&tre, Dec. 2, 2003, 2 pages.

Why GuruNet, http://web.archive.org/web/20030602200950/http://www.gurunet.com/whygurunet.html, Jun. 2, 2003, 3 pages.

GuruNet Press- Articles, http://web.archive.org/web/20030619163926/gurunet.com/buzz_articles.html, Jun. 19, 2003, 5 pages.

Michael Halvorson et al., Microsoft Office XP Inside Out, Microsoft Press, 2001, 37 pages.

* cited by examiner

LIGHTWEIGHT REFERENCE USER INTERFACE

RELATED APPLICATIONS

This application is a continuation-in-part of U.S. patent application, Ser. No. 11/234,968, filed with the United States Patent and Trademark Office on Sep. 26, 2005 entitled "Lightweight Reference User Interface," which is incorporated herein by reference.

BACKGROUND

Often when a user is reading, editing or otherwise reviewing an electronic document, the user finds he or she needs additional information about a word, name or other information contained in a given document. For example, the user may need contact information for a name contained in a document or electronic mail message. For another example, the user may need a translation of one or more words contained in a document or message written in a language other than the user's native language. For another example, the user may need research information about a company or other institution identified in a document or message.

According to prior methods and systems, the user typically must interrupt the flow of his or her work with the document to launch and utilize some type of external information or research tool. For example, the user may launch a contacts application to obtain contact information on a name contained in a document or message. The user may launch a dictionary or translation tool to obtain a definition or translation for one or more words contained in a document or message. The user may launch a research tool, for example, an Internet or intranet browsing application, associated with the application in use or separate from the application in use to obtain research information on one or more words, data items or objects contained or referenced in a document or message. While such methods and systems may provide the user with the desired information, the interruption to the user's work flow is cumbersome, time consuming and distracting, particularly when the user must obtain needed information many times for a given document or message.

It is with respect to these and other considerations that the present invention has been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

The above and other problems are solved by methods, systems and computer products for connecting users with needed information via a lightweight user interface that minimizes interruption of workflow. According to an aspect of the invention, a lightweight information user interface is deployed in an electronic document or electronic mail message in close proximity to a word, data item or other object for providing quick access to information about the word, data item or other object. The lightweight information user interface is initially deployed according to a default size, but the user interface may be selectively expanded to provide additional information.

According to other aspects of the invention, the lightweight information user interface is automatically deployed with information about a selected text item, data item or other object. The lightweight information user interface may be deployed by selecting deployment from a menu or in response to a keyboard accelerator combination, for example, ALT or CTRL key plus mouse click.

According to other aspects of the invention, information about a selected text item, data item or other object may be obtained for display in the lightweight information user interface from local or remote information sources. According to one aspect, a selected text or data item may be "smart tagged" as a particular text or data type by sending a selected text or data item to a recognizer module for identification. Once the selected text or data item is recognized as belonging to a particular type, information associated with the identified type may be provided in the lightweight user interface. For example, if a given word is identified as a name, the word may then be used to obtain contact information from a local or remote contacts information source.

According to another aspect of the invention, information may be obtained for the lightweight information user interface via an Extensible Markup Language (XML) protocol. According to this aspect, an XML-based information query is utilized for obtaining a limited amount of information associated with a selected text item, data item or object for increasing speed and efficiency of information retrieval.

According to another aspect, a lightweight information user interface may automatically provide functionality op a focused-on word, data item or object, including automatic conversion of a word or text string from one language to another language. In addition, information on a focused-on word, data item or object may be provided according to a variety of media types, including text, audio, video, music, bitmap images, etc. The multi-media information may be provided via an extended XML-based schema.

These and other features and advantages, which characterize the present invention, will be apparent from a reading of the following detailed description and a review of the associated drawings. It is to be understood that both the foregoing general description and the following detailed description are explanatory only and are not restrictive of the invention as claimed.

DETAILED DESCRIPTION

As briefly described above, embodiments of the present invention are directed to methods, systems and computer products for providing information via a lightweight information user interface about a focused-on or selected text item, data item or other object in an electronic document that minimizes interruption of workflow with the electronic document. In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
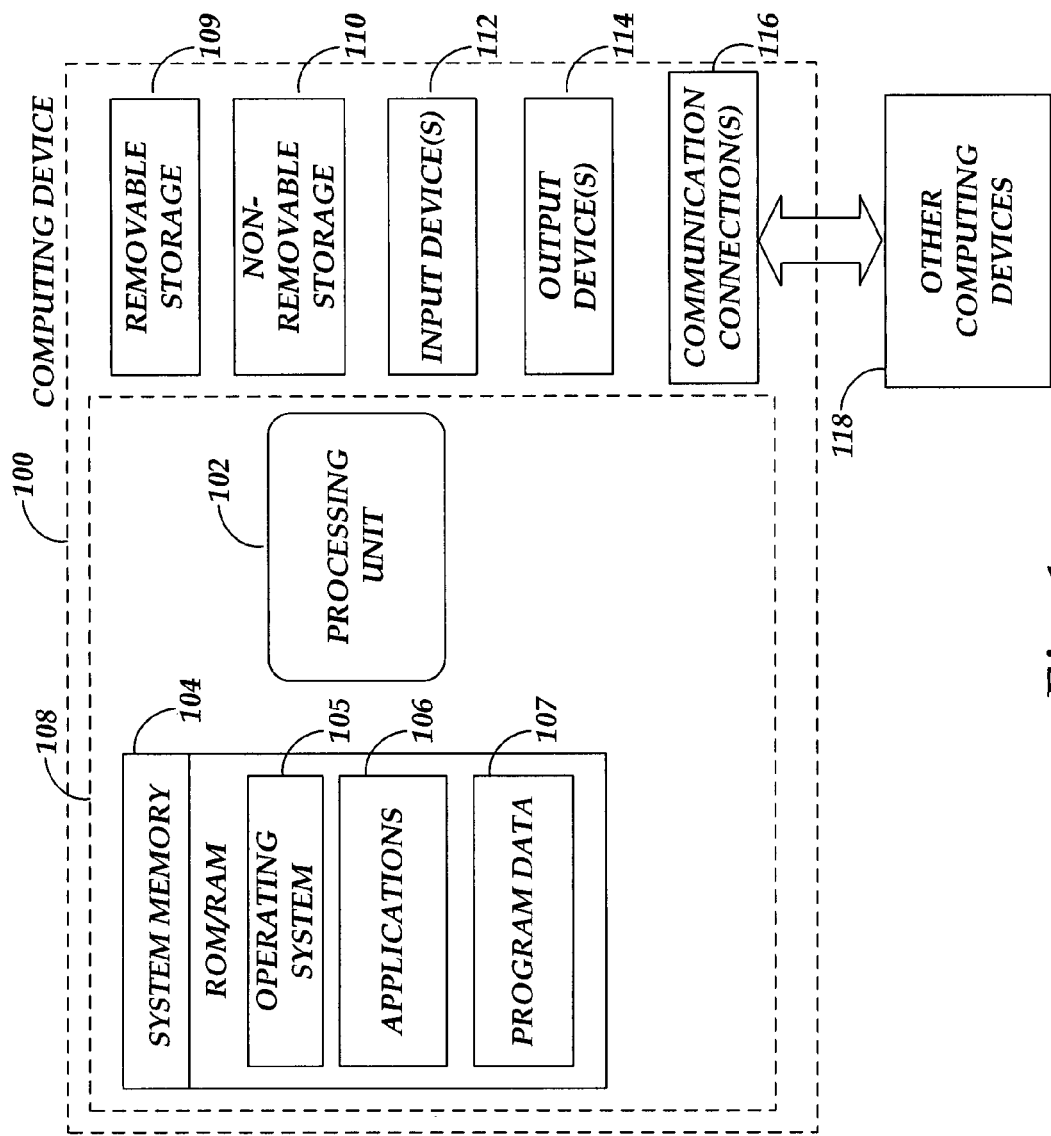
FIG. 1 illustrates an exemplary computing operating environment for embodiments of the present invention.

Referring now to the drawings, in which like numerals refer to like elements through the several Figs., aspects of the present invention and an exemplary computing operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Embodiments of the invention may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

With reference to FIG. 1, one exemplary system for implementing the invention includes a computing device, such as computing device 100. In a basic configuration, the computing device 100 typically includes at least one processing unit 102 and system memory 104. Depending on the exact configuration and type of computing device, the system memory 104 may be volatile (such as RAM), non-volatile (such as ROM, flash memory, etc.) or some combination of the two. System memory 104 typically includes an operating system 105 suitable for controlling the operation of a networked personal computer, such as the WINDOWS® operating systems from MICROSOFT CORPORATION of Redmond, Wash. The system memory 104 may also include one or more software applications 106 and may include program data 107. This basic configuration is illustrated in FIG. 1 by those components within dashed line 108.

According to embodiments of the invention, the application 106 may comprise many types of software applications, such as an electronic mail program, a calendaring program, an Internet browsing program, and the like. An example of such programs is OUTLOOK® manufactured by MICROSOFT CORPORATION. The application 106 may include a number of other types of software applications including a multiple-functionality software application for providing many other types of functionalities. Such a multiple-functionality application may include a number of program modules, such as a word processing program, a spreadsheet program, a slide presentation program, a database program, and the like. An example of such a multiple-functionality application is OFFICE® manufactured by MICROSOFT CORPORATION. According to embodiments of the present invention, the application 106 is illustrative of any software application with which an electronic document (including electronic mail messages) may be created or edited and in which a lightweight information user interface may be utilized for providing information associated with a selected text item, data item or other object in the electronic document.

The computing device 100 may have additional features or functionality. For example, the computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well known in the art and need not be discussed at length here.

The computing device 100 may also contain communication connections 116 that allow the device to communicate with other computing devices 118, such as over a network in a distributed computing environment, for example, an intranet or the Internet. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
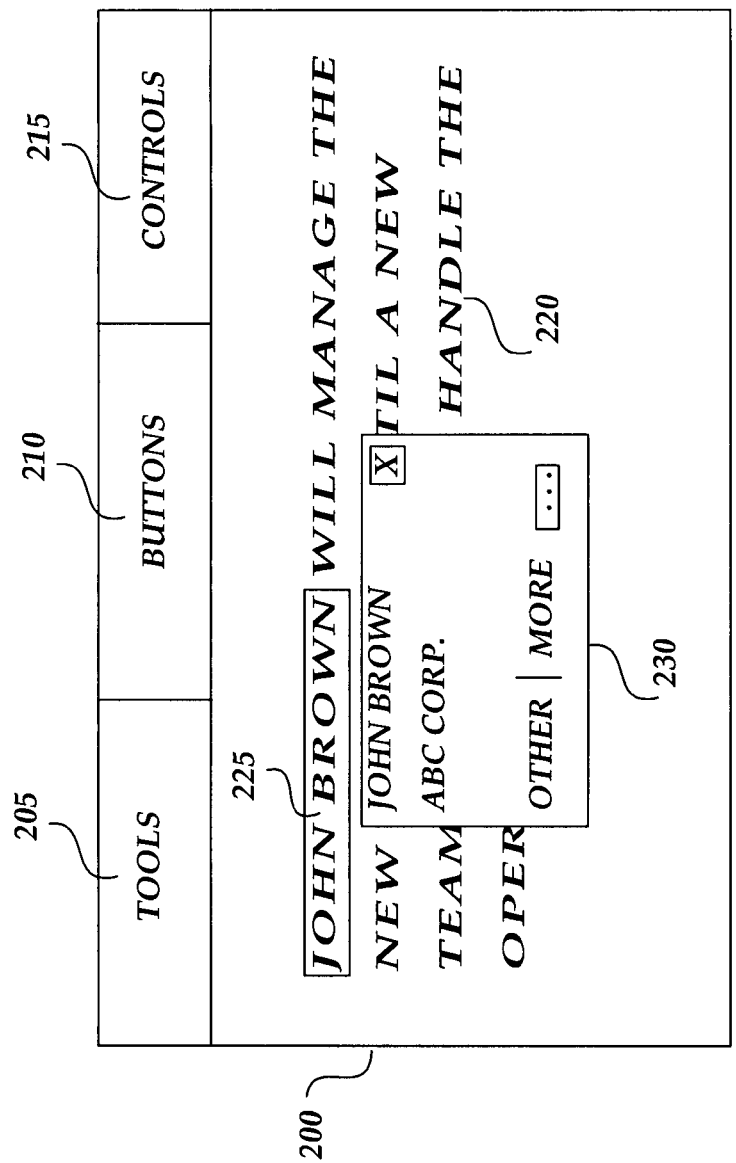
FIG. 2 illustrates a computer screen display of an electronic document showing a lightweight information user interface in proximity to a selected text item.

The example user interface 200 shown in FIG. 2 is illustrative of an electronic document workspace provided by a software application 106, for example, a word processing application, a slide presentation application, a spreadsheet application, an electronic mail application, and the like, in which an electronic document or electronic mail message may be displayed. The user interface 200 includes one or more functionality tools, buttons or controls 205, 210, 215 for providing functionality of the application in use with text, data or other objects displayed in the workspace of the user interface 200. As should be appreciated, the example user interface 200 is for purposes of illustration and example only and is not limiting of the vast number of layouts and designs that may be utilized for a user interface 200 in which a text item, data item or other object may be displayed and with which the lightweight information user interface of the present invention may be utilized.

Referring still to FIG. 2, a text item 220 is displayed in the workspace of the user interface 200. As should be appreciated, the text item 220 is illustrative of text or data displayed in a word processing application user interface, a spreadsheet application user interface, a slide presentation user interface, or the text item 220 is illustrative of the text of an electronic mail message displayed in an electronic mail message display area of an electronic mail application user interface. According to embodiments of the present invention, the lightweight information user interface 230 is deployed in close proximity to a selected text item, data item or other object in an electronic document or electronic mail message for providing one or more types of information to a user about the selected item. For example, the user interface 230 may be utilized for providing a definition, translation or research information about a selected text item in a word processing document, slide presentation document or electronic mail message document. Similarly, the user interface 230 may be utilized for providing information about a numerical value or formula contained in a spreadsheet application document. Similarly, the user interface 230 may be utilized for providing information about a selected object, for example, a picture, shape or other object contained in an electronic document.

In general, it should be understood that items in a document or electronic mail for which information may be obtained according to the present invention includes a wide range of document content such as text items, images, sounds, shapes, tables or other objects. Thus, any discussion of embodiments of the present invention with respect to a particular item, such as a text item, is for purposes of example and is not limiting of the wide rage of document content for which information may be obtained as described herein.

An example use of the lightweight information user interface 230 is illustrated in FIG. 2 where the user interface 230 is deployed in close proximity to a selected text item 225, "John Brown." According to embodiments of the present invention, the example text item 225 may have been selected because a user desires information about the selected text item, for example, a definition of the text item, a translation of the text item into a different language, or information about the text item such as contact information for the text item if the text item is a name or organizational information about the text item if the text item is a company or other institution name or symbol. According to the example lightweight information user interface 230, illustrated in FIG. 2, contact information for the name "John Brown" is obtained from a local or remote contacts file and is provided in the user interface 230 for providing the user quick and efficient contact information for the selected name without the need for interrupting the user's workflow to launch a separate contacts application.

Figure 3:
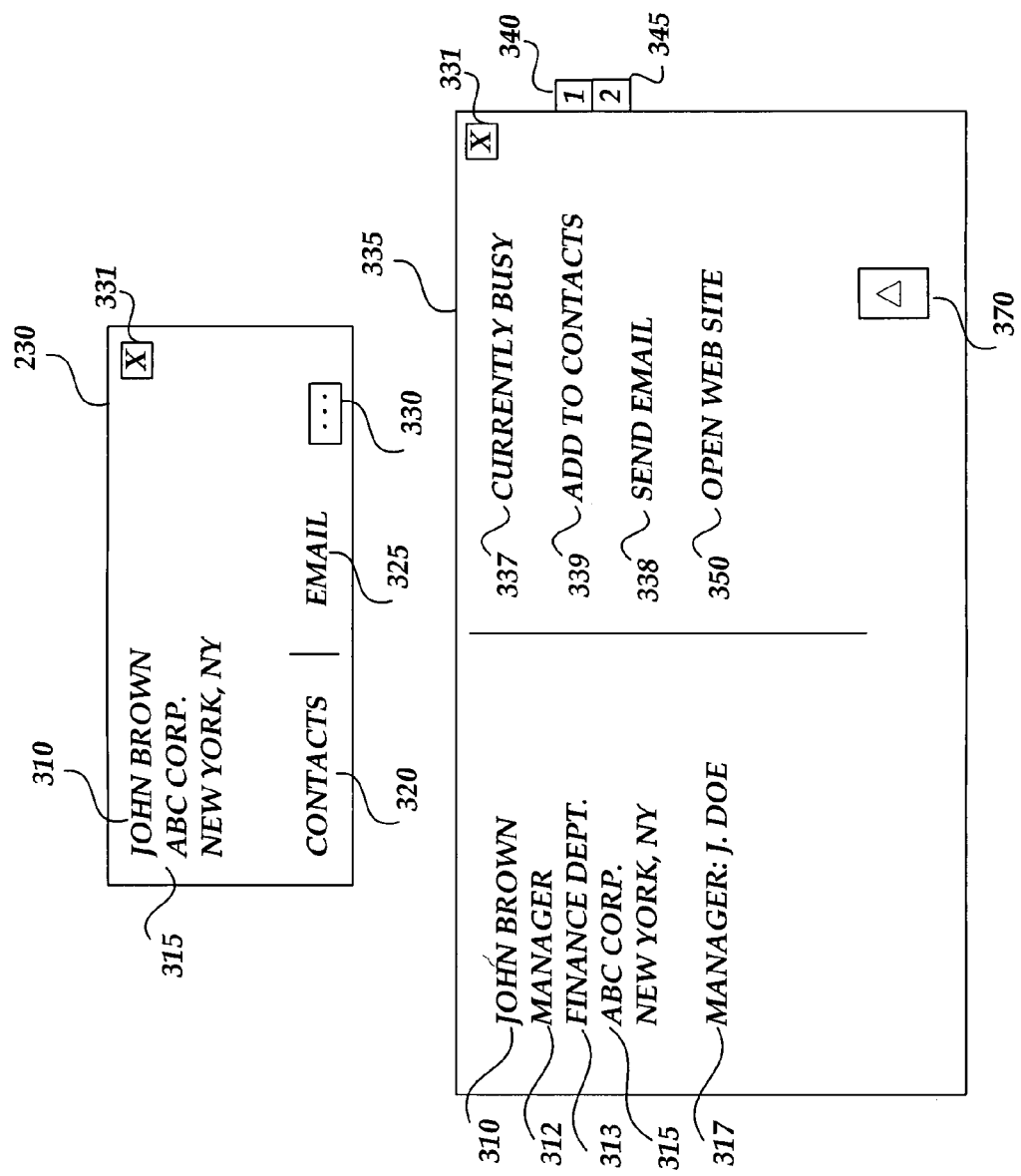
FIG. 3 illustrates a lightweight information user interface in both a default size and an expanded size according to embodiments of the present invention.

As illustrated in FIG. 3, the user interface 230 may be deployed in a variety of display sizes. According to one embodiment, a default display size for the user interface 230 has a width of 200 pixels and a height of 100 pixels when information from a single information source is provided. If information from two or more information sources is provided, a default size for the user interface 230 may include a width of 300 pixels and a height of 150 pixels. As should be appreciated, however, a variety of other default sizes may be utilized for the user interface 230 depending on available display space and depending upon the desires of a given user or application developer.

An ellipsis control 330 is provided in the user interface 230 for selectively expanding the user interface 230 to the expanded version 335 illustrated in the lower portion of FIG. 3. According to one embodiment, the size of the expanded user interface 335 may grow up to a variety of different sizes. According to a preferred embodiment, the user interface 230 may be expanded as required to fit displayed content up to a width of 600 pixels and a height of 480 pixels. According to this embodiment, a preferred width/height ratio of 2:1 is desired when determining a size to which to expand the user interface 230 for displaying additional information content. According to embodiments, information that will not fit in the display space of the user interface 230 prior to expanding the user interface 230 is truncated from display. Likewise, if the user interface 230 is expanded to the expanded version 335, information that still will not fit in the available display space is truncated from display. A user interface control 370 is provided in the expanded version 335 of the user interface 230 for collapsing the expanded version 335 back to the default size user interface 230.

According to embodiments of the present invention, information displayed in the lightweight information user interface 230, 335 may be prioritized for display. For example, contact information about a selected name may receive a first priority, electronic mail functionality associated with a selected name may receive a second priority and navigation to a personal website associated with the selected name may receive a third priority. For another example, if a dictionary definition is obtained for a selected word, a first dictionary definition may receive a first priority, a second dictionary definition may receive a second priority, and so on. For another example, if research information is obtained about a company stock symbol contained in a text document or spreadsheet document, a company name associated with the symbol may receive a first priority, and research information about the associated company may receive a second priority.

Information may be displayed in the user interface 230 according to priority level and according to available display space. That is, the display of the information may be prioritized according to a preferred display order where a most preferred information section is displayed first and a least preferred information section is displayed last. For example, priority one information may be first displayed, followed by priority two, and so on. If available display space dictates that displayed information must be truncated, as described above, the information having the lowest priority may be first truncated, leaving the maximum available display space for information having the highest priority. If information from each priority of information may fit in the available display space, then all information from each priority level of information is displayed. In addition, information with different priority levels may be displayed in different sections of the user interface in the same manner as information from different sources, as described below. As should be appreciated, if the default size user interface 230 is expanded, as described above, then additional information is displayed as display space permits.

When information is returned for display in the user interface 230, 335 from multiple information sources, information from the different information sources may be displayed in different sections of the user interface 230, 335. If the available display space in the user interface 230, 335 does not allow for display of all information for each section of information, one or more sections of information may be displayed, while other sections of information may be reduced or collapsed. Sectionalized information displayed in the user interface 230, 335 may be provided in different display orientations. For example, a first section of information may be displayed in the upper left-hand corner of the user interface 230, a second section of information may be displayed in the upper right-hand corner of the user interface 230, a third section of information may be displayed in the lower left-hand corner of the user interface 230, and so on. Alternatively, a first section of displayed information may be displayed in the upper left-hand corner of the user interface 230, a second section of information may be displayed in the lower left-hand corner of the user interface 230, a third section of information may be displayed in the upper right-hand corner of the user interface 230, and so on.

As illustrated in FIG. 3, the user interface 230 includes a first information section 315 containing example contact information for a named individual. Other sections of information 320, 325 are illustrated in a collapsed form so that enough display space for displaying the information section 315 is provided. According to an embodiment, selection of one of the collapsed sections of information, for example, section 320, causes full display of the information contained in section 320 and simultaneously causes a collapse of the presently displayed information section 315. If the user interface 230 is expanded to the expanded version 335, illustrated in FIG. 3, information from previously collapsed information sections may be fully displayed as display space permits. For example, referring to the expanded version 335, personal contact information for the example named person is provided in the left-hand side of the expanded user interface 330 to include a name 310, title 312, office department 313, company name 315 and other information. In a second section, on the right-hand side, the previously collapsed "contacts" section 320 and "email" section 325 are fully displayed for displaying free/busy information 337, contacts editing functionality 339, electronic mail functionality 338 and website access functionality 350. As should be appreciated, the information illustrated in the example user interface 230, 335 is for purposes of example only and is not restrictive of the different types of information that may be displayed in the user interface 230, 335 according to embodiments of the present invention.

Referring to the user interface 335, if information from one or more information sources is truncated because the information will not fully fit in the available display space, a numbered tab 340, 345 is provided for each truncated section of information. Selection of a displayed numbered tab causes a display of truncated information in the display space of the user interface 230, 335. For example, if a first section of information provides contact information for a selected name in a document and the contact information is truncated so that only a first half of the contact information is displayed, a numbered tab 340 is deployed for the truncated information. If the numbered tab 340 is subsequently selected, the truncated information, for example, the second half of the contact information, is displayed for review by the user. According to one embodiment, the number of deployed truncated information tabs cannot exceed the vertical length of the associated user interface 230, 335.

Content displayed in the lightweight information user interface 230, 335 may be displayed according to a variety of formatting properties. For example, the information may be displayed as rich text or other text display types, and the information may be displayed according to different font sizes, different font colors, text styles, etc. In addition, information displayed in the user interface 230, 335 may include images/icons, audio files, tables, hyperlinks to other content, hyperlinks to external files, functionality buttons or controls, forms or templates.

According to embodiments of the present invention, a search for information about a selected text item, data item or object may be initiated, and the lightweight user interface 230 may be deployed according to different means. According to a first embodiment, if an electronic document is being utilized in an edit mode, where normal edit functionality, for example, cut, copy, paste, formatting, and the like may be applied to content of the electronic document, the lightweight information user interface 230 is typically invoked and deployed by first selecting a text item, data item or object in the electronic document followed by a user action for initiating an information search on the selected item. As should be appreciated, a secondary user action, as described below, is required when the electronic document is in edit mode because a number of edit functionalities may be applied to a selected item in the electronic document 220 after selection of the item.

Referring back to FIG. 2, if the document 220 is being utilized in an edit mode, initiation of a search on the text item 225 and deployment of the user interface 230 containing information about the selected text item is performed by first selecting the text item, for example, by mouse-clicking over the text item, followed by a secondary user action. According to one embodiment, a quick information look-up may be initiated using a keyboard accelerator combination, for example, ALT plus mouse click or CTRL plus mouse click, or any other suitable keyboard accelerator combination programmed for initiating an information search on the selected item. According to another embodiment, a quick information look-up button or control may be positioned in a toolbar of buttons and controls such as the controls 205, 210, 215 illustrated in FIG. 2.

Figure 4:
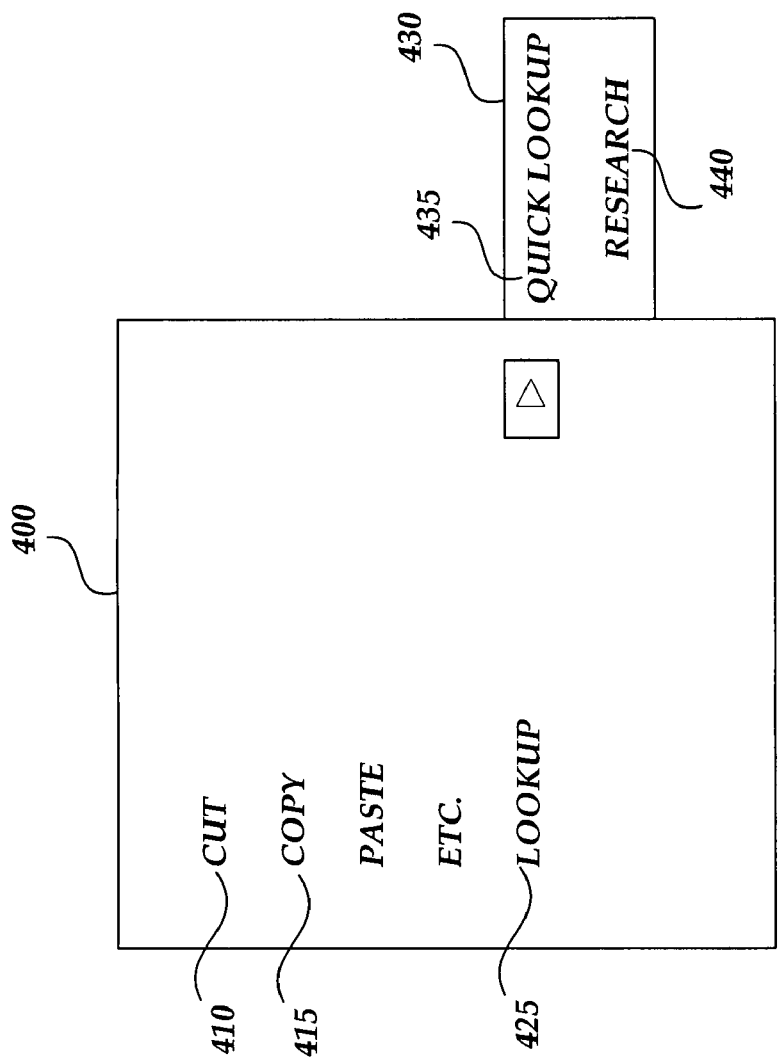
FIG. 4 illustrates a drop-down menu for selecting deployment of a lightweight information user interface according to embodiments of the present invention.

Referring to FIG. 4, according to another embodiment, a drop-down menu 400 may be deployed in the user interface 200 for containing various edit mode functionalities that may be selected for application to the selected item in the document 220. For example, upon selecting a particular item in the document 220, the user may perform many editing functions, for example, the cut function 410, the copy function 415, the paste function 420, and the like. In addition, a look-up function 425 is provided which when selected causes a pop-out menu 430 that provides additional look-up functionality. According to embodiments of the present invention, selection of the quick look-up function 435 causes initiation of an information search for retrieving information on the selected item for population in the lightweight information user interface 230, described herein. A research function 440 may be selected for providing an exhaustive information research on the selected term that may be provided via an external research tool. As should be appreciated, the menu 400 may be displayed according to a variety of mechanisms including pop-up dialog boxes, drop down menus or as a context menu that may be deployed upon selection of a text item, data item or object contained in the electronic document 220 that provides functionality applicable to the selected item, including the user interface 230 of the present invention.

If an electronic document, including an electronic mail message, is deployed in a reading mode where normal edit functionalities, such as cut, copy, paste, formatting, and the like are disabled, the information search and display via the lightweight information user interface 230 may be initiated and provided in an automatic mode upon the selection of an item in the electronic document 220. That is, because the electronic document 220 is in a reading mode, selection of an item in the electronic document 220 may be utilized for triggering an automatic information search on the selected item followed by a deployment of the lightweight information user interface 230 containing the results of the search. That is, because there is no expectation of the selection of an editing functionality following the selection of an item in the electronic document when the electronic document is in reading mode, selection of an item in the electronic document may be used for triggering an automatic information search and display, as described herein.

According to embodiments, after a user is finished reviewing the contents of the user interface 230, it may be dismissed from display according to a number of means. A user interface dismissal control 331 is provided in the default and expanded user interfaces 230, 335. Selection of the control 331 causes the user interface to be dismissed from display. Another means for dismissing the user interface 230 includes selecting a different text item, data item or object in the electronic document. Similarly, selecting, for example, by mouse clicking, in another location in the electronic document or on a different user interface component may dismiss the user interface 230, 335. In addition, a button or control may be provided in a toolbar or menu for selectively dismissing the user interface 230, 335. In addition, keyboard keys, for example, the "ESC" key, or combinations of keys, for example, "CTRL" plus "D," may be designated for dismissing the user interface 230, 335 upon selection by a user.

Figure 5:
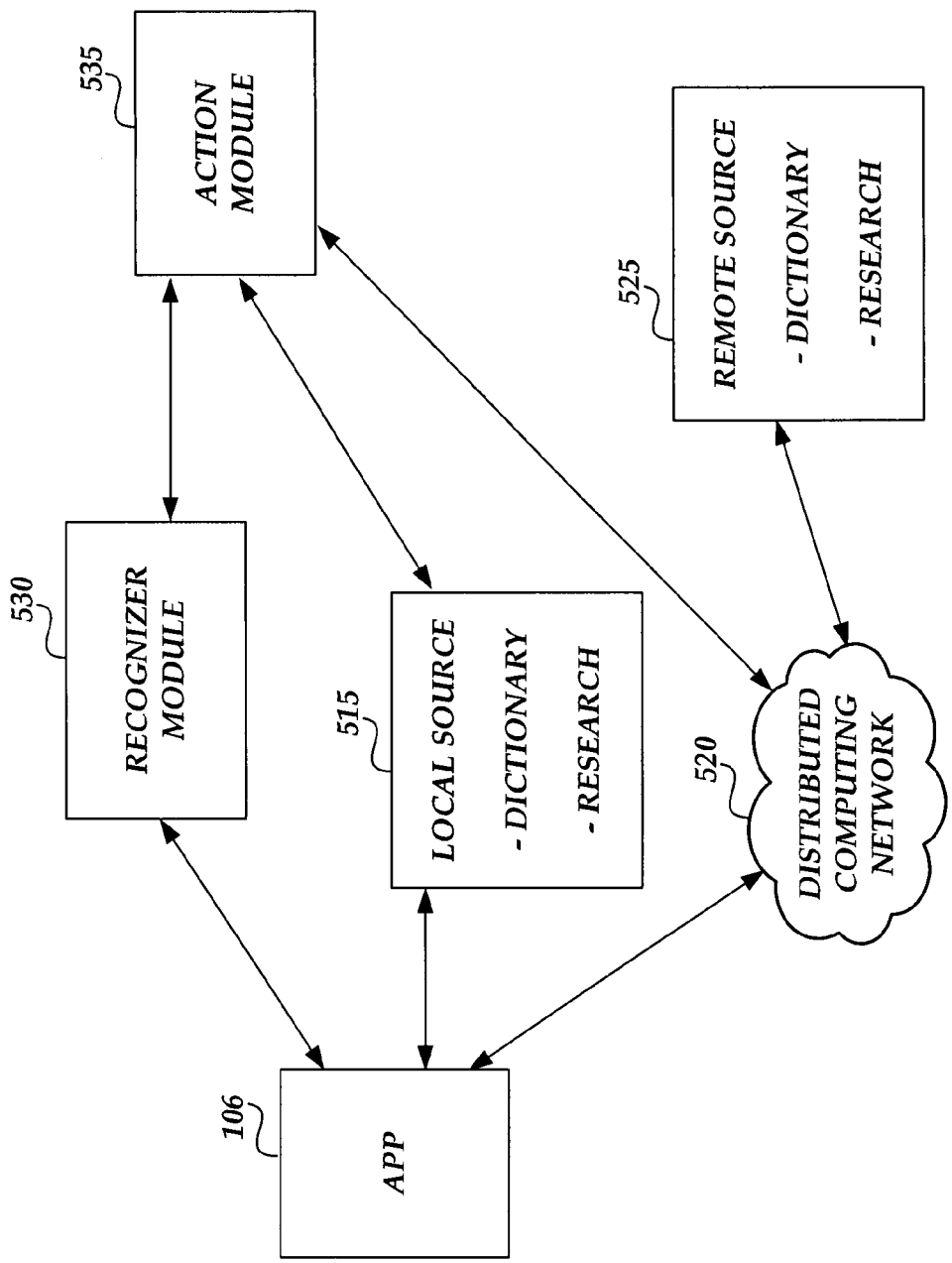
FIG. 5 illustrates a simplified block diagram of a computing architecture for obtaining information for populating a lightweight information user interface according to embodiments of the present invention.

FIG. 5 illustrates a simplified block diagram of a computing architecture for obtaining information for populating a lightweight information user interface according to embodiments of the present invention. When an item is selected in an electronic document 220, as described above, and when an information search or lookup is initiated according to one of the methods described above, the application 106 in use with the electronic document 220 may obtain the requested information from a local or remote source. As should be appreciated, the local source 515 may be maintained in memory on the local computer 100 in use by the user. Alternatively, the application 106 may query a remote source 525 via a distributed computing network 520, such as the Internet or an intranet. For example, the remote source 525 may be in the form of a server maintained in a corporate network from which individual users may obtain information associated with a selected text item in the electronic document 220 being reviewed or edited by the user. Alternatively, the remote source 525 may be a research site maintained by a third party that is accessible via the network 520.

According to one embodiment, the application 106 may obtain dictionary information or translation information on a selected text item from a local or remote source 515, 525 by comparing the selected text item against a dictionary or translation service contained on the local or remote sources. Language tools, for example, dictionary sources and translation services may be provided in the lightweight information user interface 230 by comparing the selected item against items (e.g., words or phrases) contained in the dictionary sources or translation services. According to one embodiment, information retrieval from a dictionary source may be based on the user interface language in use for the application 106. For example, if the current user interface language in use for the application 106 is French, then upon the initiation of an information lookup for display in the user interface 230, described above, a French dictionary source at the local source 515 or remote source 525 will be utilized. Alternatively, a default language may be set for the application 106, and dictionary sources associated with the default language may be utilized. Alternatively, any editing languages that have been enabled by the user for use with the application 106 may be utilized for obtaining dictionary information from the local source 515 or remote source 525. Alternatively, the language, for example, French, German, Italian, etc., of text being entered or edited into an associated electronic document or mail document may be used to control the language of an associated dictionary source.

According to another embodiment, bilingual dictionary and translation sources may be utilized where a selected term may be automatically translated from a first language, for example, English, to the selected user interface language and vise versa. Or, an automatic translation from a first language to a selected default language and vice versa may be selected. Alternatively, an automatic translation of the selected term from a first language to an enabled editing language and vice versa may be selected. Or, an automatic translation may be obtained for a selected text item for any editing language enabled for the application 106 to any other editing language enabled for the application 106 and vice versa. As should be appreciated, in addition to obtaining translations of selected text items, as described above, definitions for a selected text item may be obtained in different languages, for example, the user interface language, a default language, or any editing languages enabled for the application 106. In addition, the language, for example, French, German, Italian, etc., of text being entered or edited into an associated electronic document or mail document may be used for determining a first or starting language for translation of an item to a second language or for obtaining a definition in a second language.

In addition to obtaining dictionary definitions or translations of selected text items, as described above, selected items in an electronic document 220 may be "smart tagged" for identifying a type for the selected item which may then be compared against an information source applicable to the identified text or data item type. As described below, "smart tagging" an item allows the item to be recognized and tagged in a manner that facilitates a more accurate information lookup based on the context and/or meaning of the tagged item. For example, if a selected text item may be identified as a name, then the name may be compared against a database of names, for example, a contacts database, for retrieving information about the identified name, for example, name, address, telephone number, and the like, for population in the lightweight information user interface 230. Similarly, if a number string, for example, a five-digit number, may be identified as a ZIP Code, then the number string may similarly be compared against ZIP Codes contained in a database, for example, a contacts database for retrieving information associated with the identified ZIP Code.

Referring to FIG. 5, according to this embodiment, when a text or data item is selected by the user, the selected text or data item is passed to a recognizer module 530 where the selected text or data item is compared against text or data items of various types for recognizing and identifying the text or data item as a given type. For example, if a text item 225, such as the name "John Brown," is selected by a user from an electronic document 220, or from an electronic mail message displayed by the application 106, the selected text item is passed to the recognizer module 530. At the recognizer module 530, the selected text item is compared against one or more databases of text items. For example, the text item "John Brown" may be compared against a contacts database for finding a matching entry in the contacts database. For another example, the text item "John Brown" may be compared against a telephone directory for finding a matching entry in a telephone directory. For another example, the text item "John Brown" may be compared against a corporate or other institutional directory for a matching entry.

For each of these examples, if the text item or other content is matched against content contained in any available information source, then information applicable to the selected text item of the type associated with the matching information source may be returned. According to one embodiment, once a given text item is identified as associated with a given type, for example, a name, an action module 535 may be invoked for passing the identified text item to a local information source 515 or to a remote source 525 for retrieval of information applicable to the text item according to its identified type. For example, if the text item "John Brown" is recognized by the recognizer module 530 as belonging to the type "name," then the action module 535 may pass the identified text item to all information sources contained at the local source 515 and/or the remote source 525 for obtaining available information associated with the selected text item of the type name. For example, if the local source 515 and/or remote source 525 contains a contacts database, a telephone directory database, and a corporate directory database where each of the example databases contain information associated with the data type name, the identified text item "John Brown" may be compared against data contained in each of those databases for matching entries.

Information matching the selected text item from each available source may be returned to the application 106 for populating the lightweight information user interface 230. Thus, following from the present example, if the user selects the text item "John Brown" and information associated with the selected text item is found in each of a contacts database, telephone directory, and corporate directory, three information sections may be populated in the lightweight information user interface 230 for providing the user contact information, telephone directory information, and corporate directory information for the selected text item.

As should be appreciated, the recognizer module may be programmed for recognizing many data types, for example, book titles, movie titles, addresses, important dates, geographic locations, and the like. Accordingly, as should be understood, any text or data item passed to the recognizer module 530 from the application 106 that may be recognized and identified as a particular data type may be compared against a local or remote information source for obtaining information applicable to the selected text or data item according to the text or data item type identified for the selected text or data item. As will be described below, according to an embodiment of the invention, information may be returned according to a variety of media types. For example, if the recognizer module recognizes a text string as a movie title, an audio clip from the associated movie may be returned which may be played to a user via the lightweight reference user interface. Similarly, a returned video clip may be played. In addition, information about a selected word, text item or object may be returned in different media types, for example, audio, video, picture, bitmap image, etc.

According to another embodiment, the recognizer module 530 and action module 535 may be provided by third parties for conducting specialized information retrieval associated with different data types. For example, a third-party application developer may provide a recognizer module 530 and action module 535 for recognizing text or data items as stock symbols. Thus, if a user selects a stock symbol contained in an electronic document 220 or received in an electronic mail message, the stock symbol may be passed to the recognizer module 530 supplied by the third-party developer for recognizing the selected text item as a stock symbol. Once the selected text item is recognized as a stock symbol, for example, the associated action module 535 may pass the identified text or data item to a local or remote information source, for example, an information source provided by a financial information network, for obtaining a company name and/or information about a company associated with the identified stock symbol.

As should be appreciated, any number of text or data types may be utilized for identification via the recognizer module 530 and for obtaining information on a selected text or data item identified as a given text or data item type, as described herein. Further, according to embodiments of the present invention, the action module 535 may be programmed for providing additional research functionality in the lightweight information user interface 230. For example, if a search in the local or remote information source obtains a vast amount of information on an identified text or data item, for example, a company name, an executable functionality, for example, a "additional research" button, may be populated in the lightweight information user interface which, when subsequently selected by a user, causes additional research for expanded search information on the selected text or data item.

Figure 6:
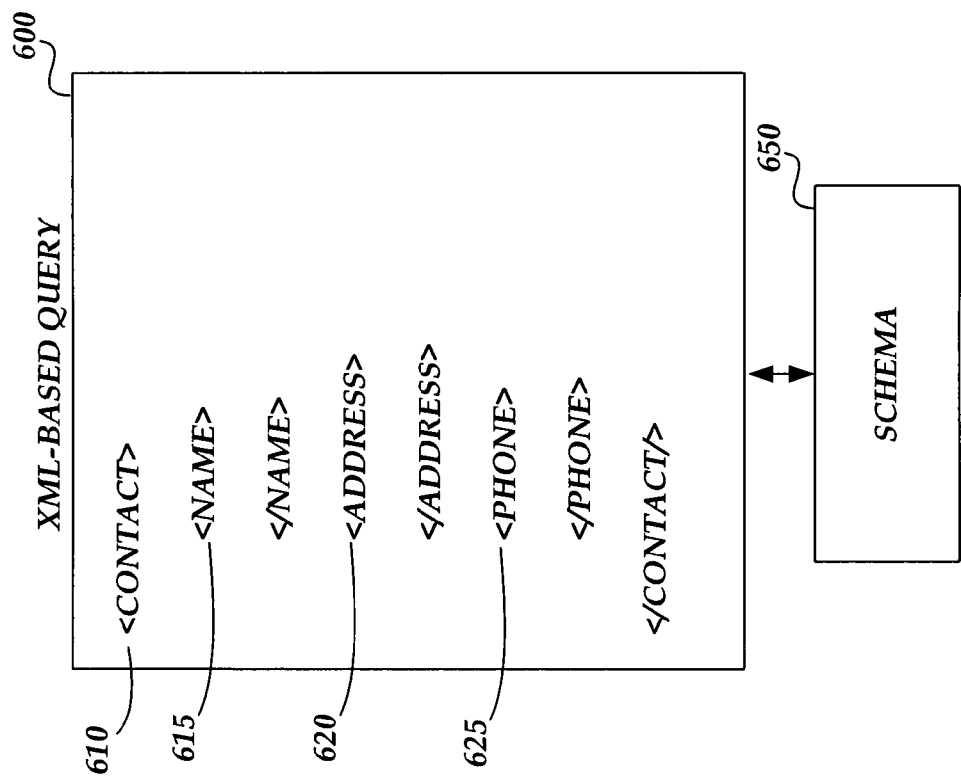
FIG. 6 illustrates a simplified block diagram of an XML-based information query for information required for populating a lightweight information user interface according to embodiments of the present invention.

FIG. 6 illustrates a simplified block diagram of an XML-based information query for information required for populating a lightweight information user interface 230. According to embodiments of the present invention, speed and efficiency of information retrieval and display to the lightweight information user interface 230 is enhanced by use of a lightweight Extensible Markup Language (XML) protocol for information retrieval. The XML representation 600 illustrates example XML markup for a query for contacts information associated with a selected text item identified as a name in an electronic document or electronic mail message. An associated schema 650 is illustrated which provides XML grammar, syntax and validation rules governing the XML markup applied to the query 600. As described below, according to one embodiment, the schema 650 is extensible to support information returns to the lightweight reference user interface according to a variety of media types, including text, audio (including voice), video, music, pictures (in multiple formats), bitmap images, etc.

According to embodiments of the present invention, when an information source query is passed from the application 106 to a local source 515 or remote source 525, the XML-based query 600 is utilized as a lightweight query for returning a limited amount of information, for example, contact information responsive to the selected text item, data item or object selected in the electronic document.

When the XML-based query 600 is received at the local or remote information source, the query is parsed in association with the attached schema 650 for quickly determining the types of data that should be returned in response to the query. As should be appreciated, because the local source and remote source 525 may parse the XML-based query based on the associated schema, data from the local and/or remote sources 515, 525 may be efficiently matched to corresponding XML markup in the query 600 for producing responsive information to the query. For example, referring to the query 600, illustrated in FIG. 6, once the local and/or remote sources 515, 525 receive the XML-based query, information in the local and/or remote sources 515, 525 corresponding to XML markup contained in the query 600 and corresponding to the identified text item, data item or object may be populated into a response that is passed back to the application 106 for populating the lightweight information user interface 230, 335 described herein. Thus, a limited and/or targeted amount of information may be obtained from the local and/or remote information sources for presentation in the lightweight information user interface 230, 335 as opposed to obtaining all available information associated with a given text item, data item, or object selected in an electronic document 220.

As should be appreciated, the example XML markup 600 is not intended to show well-formed XML, but is for purposes of illustration only. Further, the example XML-based query 600 is not limiting of the vast number of different markup-based queries that may be generated for obtaining different amounts and types of information from one or more information sources for populating the lightweight information user interfaces 230, 335, described herein.

As briefly described above, according to an embodiment of the present invention, the lightweight information user interface 230 may be utilized for providing functionality on a word, data item or object, including automatic conversion of a word or text string from one language to another language. In addition, information on a selected word, data item or object may be provided according to a variety of media types, including text, audio video, music, pictures (in multiple formats), bitmap images, etc.

Display of Linguistic and Translation Information on Focus

Figure 7:
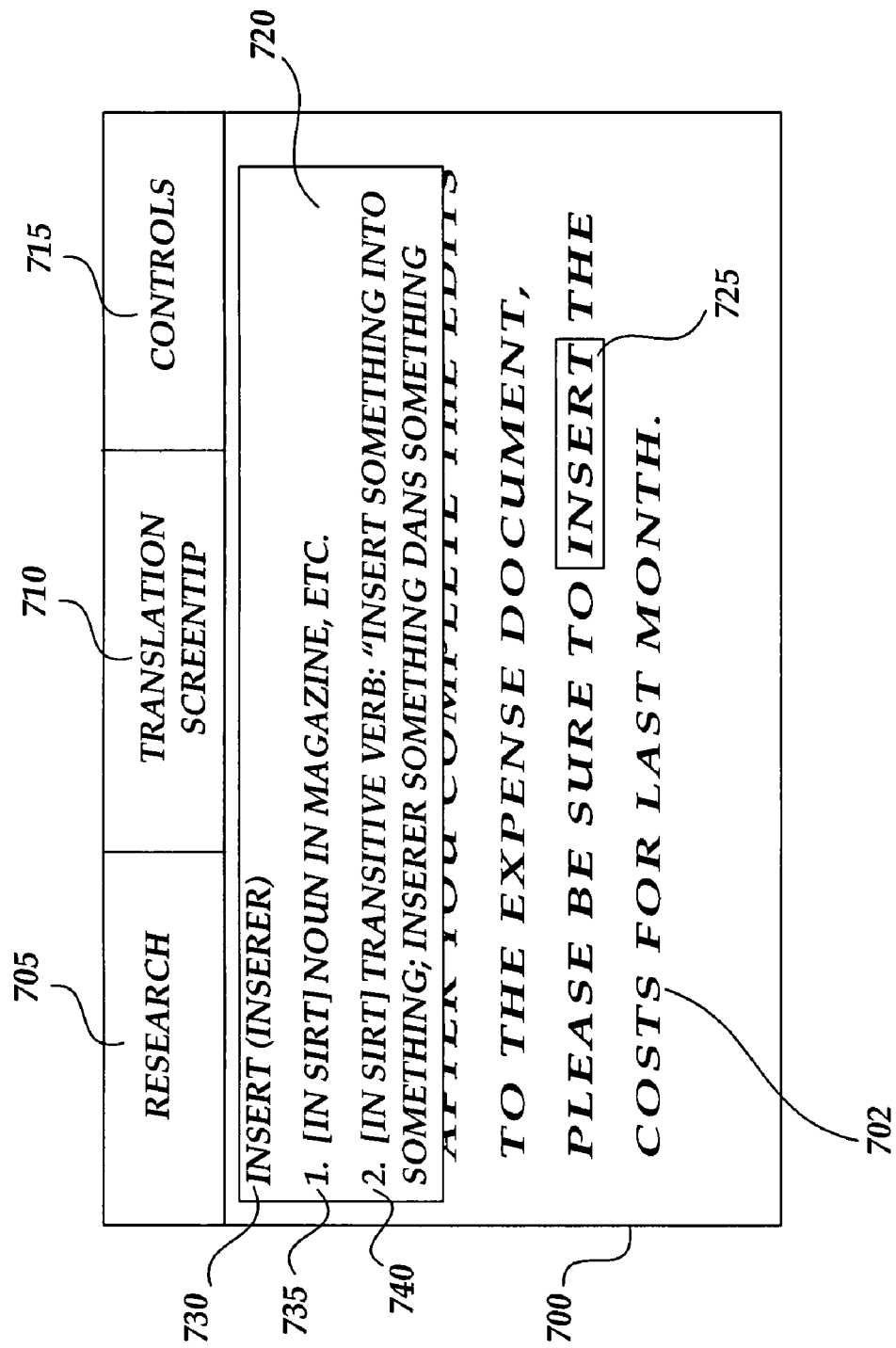
FIG. 7 illustrates a computer screen display of an electronic document showing a lightweight information user interface deployed for language translation.

Referring now to FIG. 7, another embodiment of a lightweight information user interface is illustrated and described. According to this embodiment, the user interface 720 may be automatically deployed in a displayed document 702 for providing information on a focused-on word or object 725. For example, upon focus on a given word in a displayed document, such as the word "insert" 725, the lightweight user interface 720 may be automatically deployed to provide a translation, definition or other useful information for the focused-on word or object. According to one embodiment, focus on a given word or object may be in the form of a "mouse-over" on the desired word or object. Other focus methods may include touching the screen over a desired word or object with an electronic pen or stylus. As should be appreciated, any suitable method of applying focus to a given word or object in an electronic document 702 may be utilized for triggering automatic deployment of the user interface 720.

As described above, when the functionality associated with the user interface (UI) 720 is activated ("turned on"), the user interface 720 is automatically deployed in an associated document 702 upon focus on a given word or object for providing the activated functionality. For example, if a translation functionality is activated, then a translation for a focused-on word will automatically be displayed in the user interface 720 upon focus (e.g., mouse-over) on a given word according to a selected translation language. That is, if a French translation language is selected for the UI 720, then if a user mouses over a given word, for example, "insert" 725, then the UI 720 automatically will be displayed, as illustrated in FIG. 7, and will include a translation, for example, the French translation "inserer" for the focused-on word. As illustrated in FIG. 7, a definition for the focused-on word is provided in addition to a translation according to a selected translation language. In the example definitions provided, a couple of possible definitions are displayed, including an example use of the focused-on word according to the translation language applied to the focused-on word.

A great variety of information may be provided in the UI 720 upon focus on a given word or object. For example, in addition to translation and definition information, thesaurus information, antonyms, synonyms and the like may be provided for a focused-on word or object. In addition, a focused-on word or object may be sent to a recognizer function, as described above with respect to FIG. 5, and a variety of other information may be provided, for example, research information on a given word or object (e.g., Internet-based, encyclopedia-based, etc.). As should be appreciated, the layout and display location of the example user interface 720, illustrated in FIG. 7, are for purposes of example only and are not limiting of the different ways in which the translation and definition information may be displayed to a requesting user.

Figure 8:
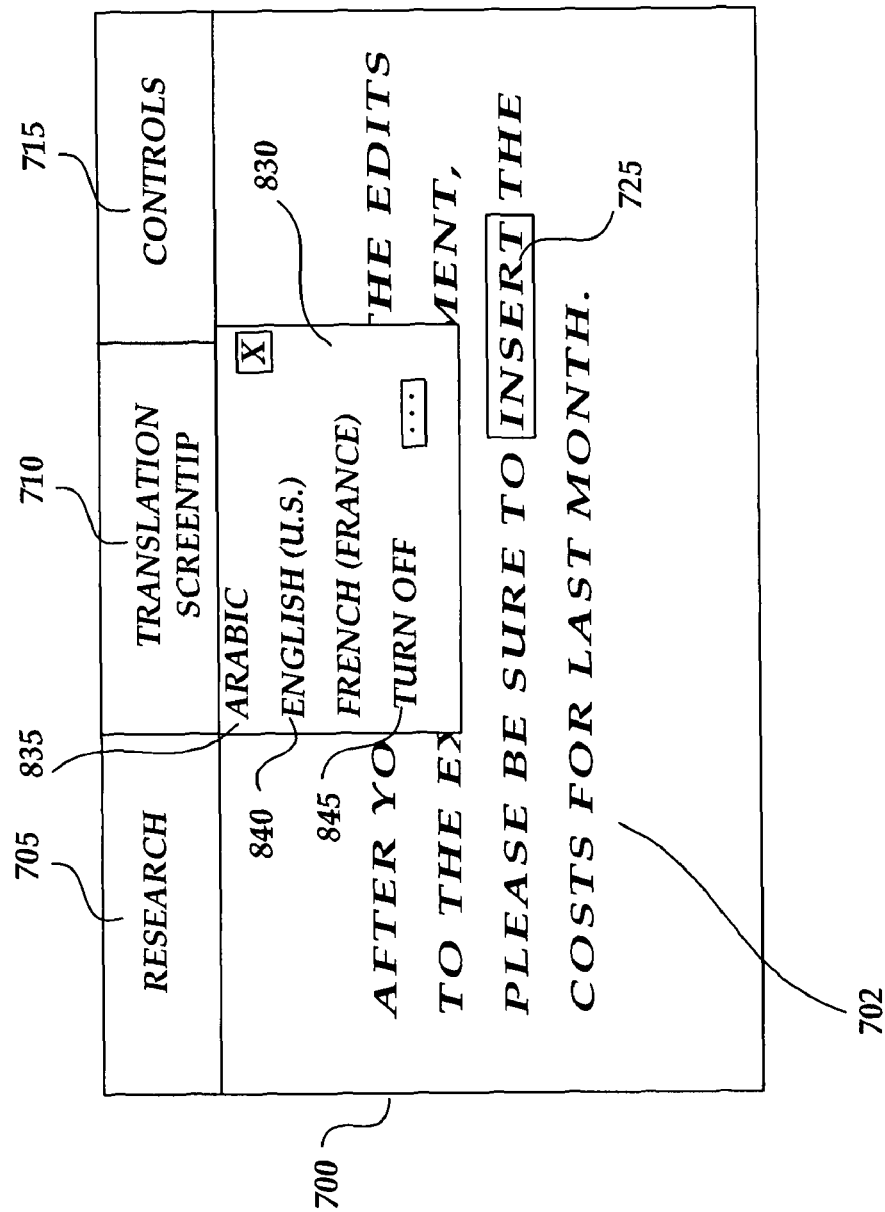
FIG. 8 illustrates a computer screen display of an electronic document showing a user interface component for selectively activating the lightweight information user interface of FIG. 7.

As described above, deployment of the user interface 720 is automatic upon the focus (e.g., mouse over) on a desired word or object. According to embodiments, the user interface 720 may be activated for automatic deployment via a variety of entry points and/or deployment means. FIG. 8 illustrates a computer screen display of an electronic document showing a drop down menu with which the functionality of the user interface 720 may be activated ("turned on") and with which a given translation language may be selected for application to focused-on words or objects. As illustrated in FIG. 8, a row of functionality buttons or controls at the top of the example user interface 700 provide functionalities that may be applied to text, data items or objects in an associated document.

A drop down menu 830 may be deployed in response to the selection of or focus on a "Translation Screentip" control 710. The drop down menu includes a number of translation languages that may be applied to a focused-on word or object, for example, the word "insert" 725. As should be appreciated, the translation languages illustrated in FIG. 8 are for purposes of example only and are not exhaustive of the numerous translation languages available for use in accordance with embodiments of the invention. The drop down menu 830 also illustrates a "turn off" control which may be selected for deactivating the UI 720 and associated functionality.

After a given translation language is selected from the drop down menu 830, the translation functionality is activated or "turned on," and the menu 830 is dismissed. Subsequently, when a user focuses (e.g., mouse-over) on a given word, for example, "insert" 725, the focused-on word is sent to a translation module as described above with reference to FIG. 5, and a returned translation is automatically populated in a deployed user interface 720. According to one embodiment, in addition to a translation, a definition for the focused-on word may be populated in the UI 720, or a concise version of the UI 720 may be deployed to show only the translation, as illustrated below with respect to FIG. 10. As should be appreciated, whether a definition is shown with the translation, as illustrated in FIG. 7, is readily configurable.

As mentioned above, the UI 720 may be utilized for displaying information other than translations and definitions, for example, a "Research" button or control 705 may cause deployment of the menu 830 for providing research on a selected word, data item or object in the associated document. For example, the menu 830 deployed in response to selection of or focus on "Research" button 705 may provide resources, such as encyclopedias, Internet-based research tools, or other lookup methods for finding information associated with a word, data item or object focused on in the associated document.

Figure 9:
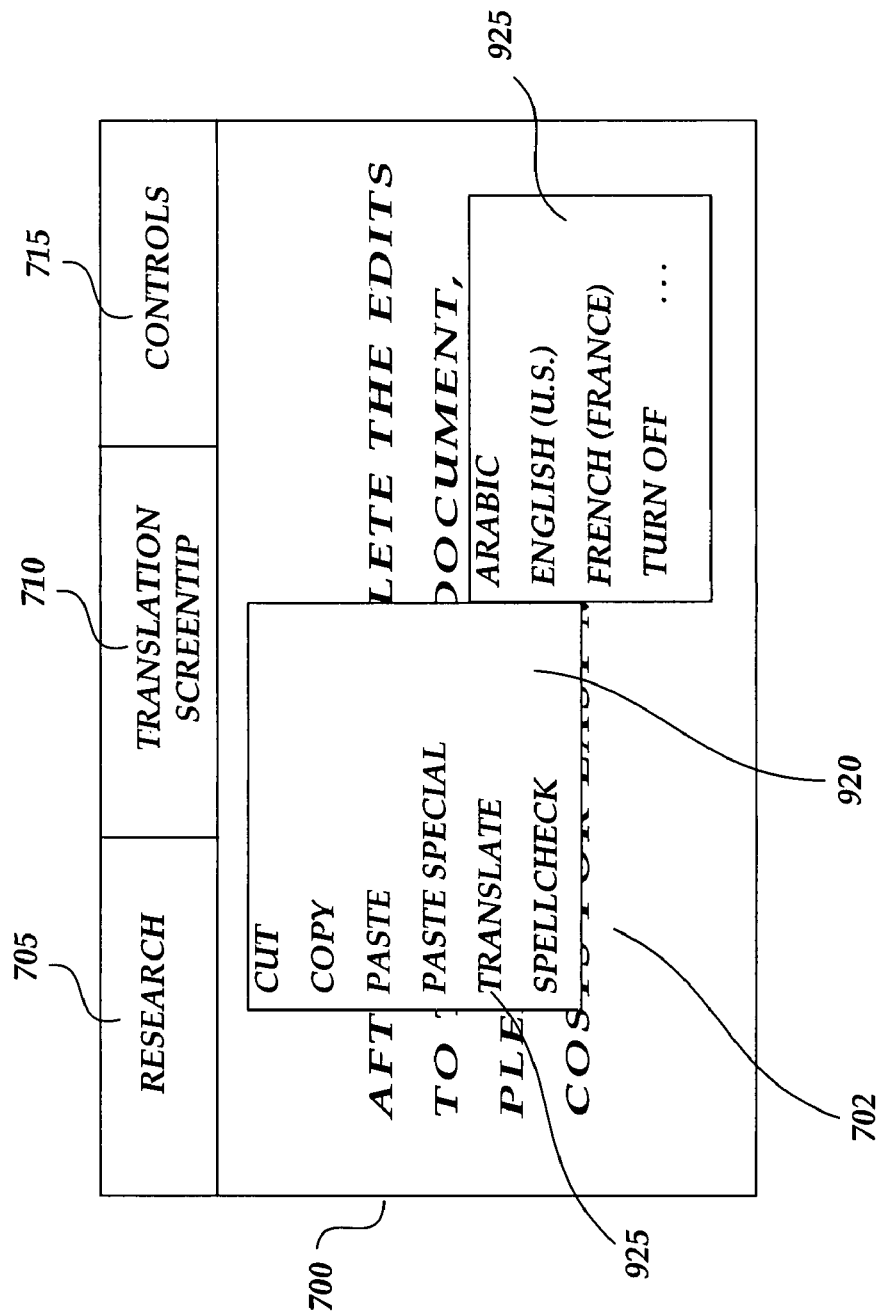
FIG. 9 illustrates a computer screen display of an electronic document showing a user interface component associated with a deployed context menu, the user interface component allowing activation of the lightweight information user interface of FIG. 7.

The user interface 720 may be activated by other means in addition to the drop down menu 830, illustrated in FIG. 8. For example, in response to a "mouse-over" focus on a given word when the UI 720 has not been activated, a context menu 920 may be displayed, as illustrated in FIG. 9. In FIG. 9, a document 702 is illustrated in which a context menu 920 has been deployed for providing functionality of an associated application, for example, a word processing application, based on the context of a document focus point or insertion point. For example, upon focus or placement of an insertion point in a text selection contained in the document 702, a context menu 920 may be automatically deployed for providing functionality associated with the editing of a text selection. For example, text editing functions such as "cut," "copy" and "paste" are illustrated. In contrast, if an object, such as an embedded picture, is selected or focused on, the context menu 920 may be deployed and may be populated with functionality associated with the editing of embedded pictures.

As illustrated in FIG. 9, the context menu 920 includes, among other things, a "Translate" functionality, which when selected, may cause deployment of the fly out menu 925, which in similarity to the drop down menu 830, may automatically activate the functionality of the lightweight information user interface 720 and may provide one or more translation languages for application to a focused-on word. As described above with reference to FIG. 8, the fly out menu 925 may be launched in response to selection of a "research" type function from the context menu 920 for providing access to other information that may be displayed for a focused-on word or object.

As described above, a selected word, data item or object may be passed to a recognition resource, such as the recognizer module 530 illustrated and described with respect to FIG. 5, for returning information and actions responsive to the request. Thus, if a user selects a research, lookup or translation functionality for application to a particular word, text string or object, a focused-on word, text string or object may be passed to the recognizer module 530 and then on to an appropriate local or remote source for research information and potential actions responsive to the request.

As described above with reference to FIG. 6, an XML-based query may be used to query one or more local or remote resources for information and/or actions, for example, a translation or dictionary lookup, in association with a schema 650. According to an embodiment, a dictionary schema 650 may be structured and defined with property tags for enhancing the display of dictionary information as illustrated in FIG. 7. An example XML-based schema 650 for dictionary information is set out in Table 1 below.

TABLE 1

<Headword><B>insert</B> </Headword>
<Num>1.</Num> <Text> <I>noun in magazine etc encart masculin </I> </Text>
<Num>2.</Num><Text>transitive verb; <B>insert something into something inserer something dans something</B></Text>

Figure 10:
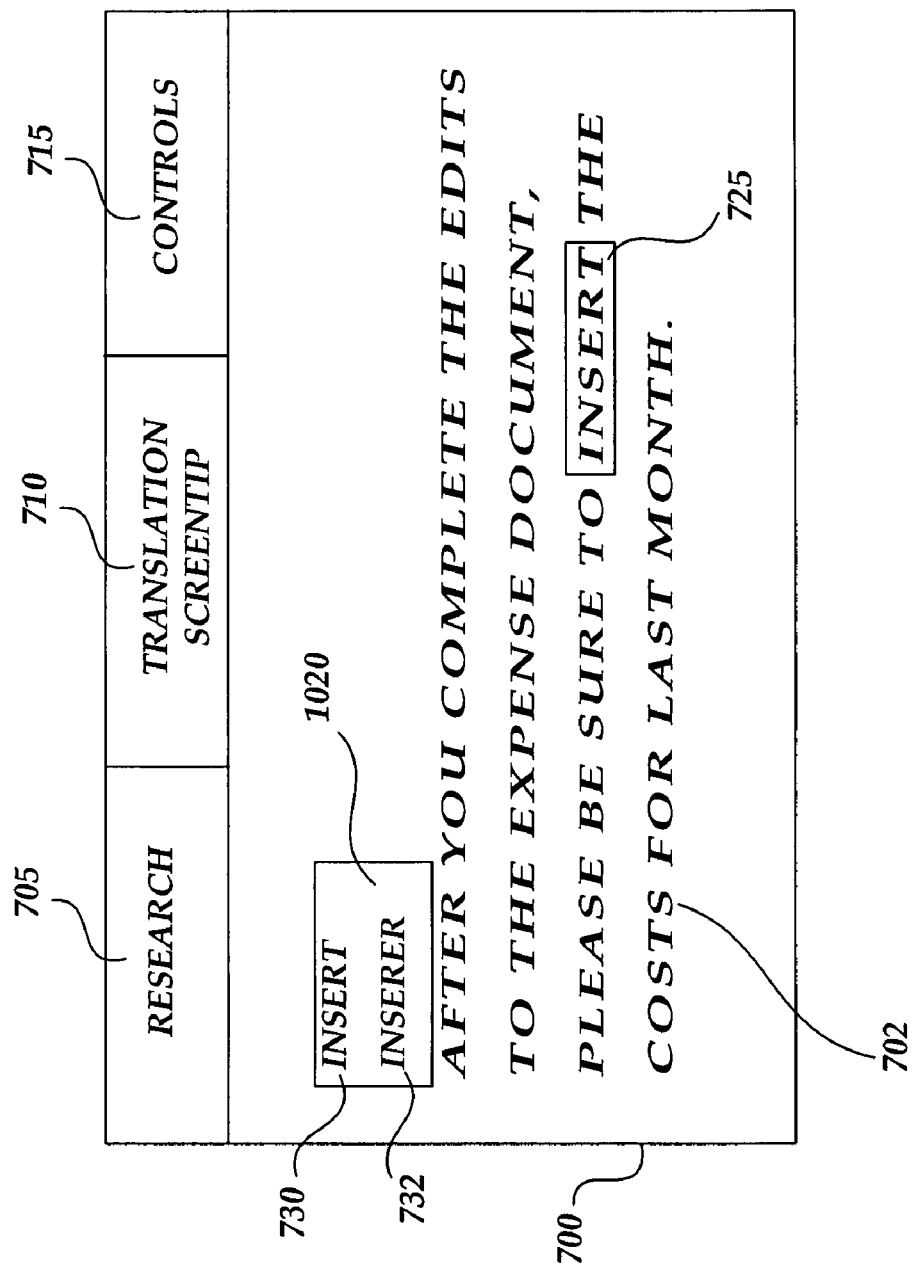
FIG. 10 illustrates a computer screen display of an electronic document showing a lightweight information user interface deployed with language translation information for a focused-on word.

With a defined schema structure, extra display properties may be provided in associated user interface 720 for displaying responsive information. For example, through use of a "concise" tag (XML-based), the user interface 720 may be used to display a concise version of responsive information instead of a full display of information, as illustrated in FIG. 7. Thus, as illustrated in FIG. 10, an example document 702 is provided in which a user has focused on a desired word "insert" after activating the translation function for translating words from English to French. Through use of the "concise" tag, a smaller version of the user interface 1020 is deployed and displays only a translation for the focused-on word, but does not display additional information, such as a definition for the word. As illustrated in FIG. 10, the lightweight information user interface 1020 is deployed in the document 702 and shows the French translation "inserer" for the focused-on word "insert." Rather than display a lengthy text string such as "The French translation of the English term 'insert' is 'inserer,'" a concise display simply provides the translated word corresponding to the starting word. An example XML-based schema 650 for translation services utilizing an example "concise" tag is set out in Table 2 below.

TABLE 2

<Headword><B>insert</B> </Headword>
<Num>1.</Num> <Text> <I>noun in magazine etc encart masculin </I> </Text>
<Num>2.</Num><Text>transitive verb; <B>insert something into something; inserer something dans something</B></Text>
<concise> inserer</concise>

Figure 11:
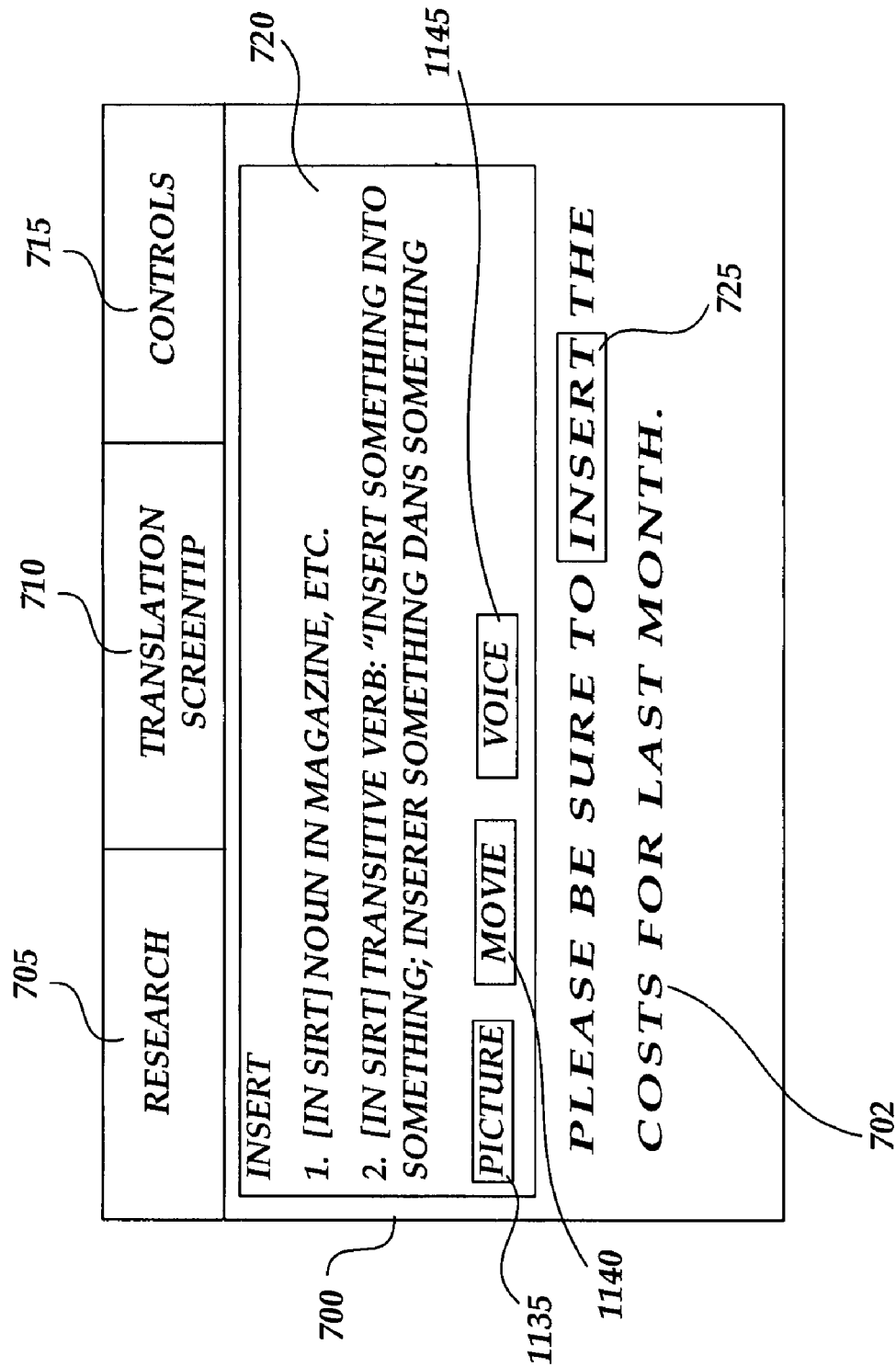
FIG. 11 illustrates a computer screen display of an electronic document showing a lightweight information user interface deployed for language translation and showing icons for selectively receiving information according to different media types.

FIG. 11 illustrates a computer screen display of an electronic document showing the lightweight information user interface 720 deployed for language translation and showing icons for selectively receiving information according to different media types. As briefly described above, information may be provided on a focused-on word, data item or object according to a variety of media types, including text, audio, video, music, pictures (in multiple formats) bitmap images, etc.

According to the embodiment illustrated in FIG. 11, a focused-on word, data item or object may be matched with information available for the focused-on word according to different media types, and each type of information may be provided via the lightweight information user interface 720, described herein. As illustrated in FIG. 11, a number of icons 1135, 1140, 1145 are displayed in the user interface 720 for providing information on a focused-on word according to different media types. For example, selection of the picture control 1135 may result in a picture associated with the focused-on word being displayed to a user in similar fashion as illustrated above with reference to FIGS. 7 and 10. For example, upon focus on the word "insert" and upon selection of the picture icon 1135, a picture showing an object being inserted into a container may be displayed for providing a visual definition for the word. Selection of the movie control 1140 may cause the display of a movie clip associated with the focused-on word, for example, a video clip of an object being inserted into a container, in response to a mouse-over on the word "insert." Likewise, selection of the voice control 1145 may cause the playing of an audio clip that speaks the focused-on word in the starting language and again in the translated language, followed by a speaking of a definition for the focused-on word. Other media type controls may be provided for providing other types of responsive media, such as music.

According to an embodiment, the media type controls are populated in the user interface 720 based on availability of the associated media. That is, if information responsive to a research, lookup or translation, for example, is available in an audio clip, then the audio clip will be returned from the appropriate local or remote resource, and the audio (e.g., voice) icon will be populated in the user interface 720 for selecting the returned audio clip for play. Similarly, if a movie clip is available as a responsive resource, then the movie clip will be returned to the user interface 720, and the movie icon will be populated in the user interface 720, as illustrated in FIG. 11.

For an example of the provision of information via alternate media types, if a given word or text string is selected from an associated document for translation from English to French, a French translation of the word may be provided, as illustrated and described above with reference to FIG. 10. On the other hand, if an audio clip for the translation is available, the audio clip may be returned and the associated audio icon will be populated in the user interface 730. If the audio icon 1145 is selected, an audio clip may be played to the user with which the user is able to hear a voice translation of the selected word. For example, the user may hear a voice translation such as "The French translation of the word "insert" is 'inserer.'"

For another example, if the user focuses on a name in a given document, for example, "Neil Armstrong," and then selects a research functionality, for example, an encyclopedia functionality, from the user interface 830, the user may be provided a variety of information on the example subject according to a variety of different media types. For example, selection of the picture control may provide the user-with a picture according to a variety of picture formats of the research subject, for example, "Neil Armstrong." Similarly, a movie clip may be provided to the user which when selected, may provide the user a movie clip of Neil Armstrong's famous walk on the surface of the moon. Similarly, selection of the voice control 1145 may cause the playing of an audio clip to the user, for example, Neil Armstrong's famous quotes from the surface of the moon. Likewise, if the user selects another functionality, for example, a dictionary functionality associated with a focused-on word, for example, "astronaut" the user may receive a picture associated with the defined word or text string, for example, a picture of an astronaut in a space suit. Of course, in all of the above instances, the user may receive textual information, as illustrated in FIGS. 7 and 10, in addition to the other media types discussed above.

In order to facilitate the presentation of the multimedia information in the UI 720, as described above, the schema provided for display of information in the UI 720 is extended to provide additional multimedia information. An example schema 650 for providing multimedia information via the user interface 720 is set out below in Table 3. For example, in the schema set out below, use of a "multimedia" tag is illustrated in a dictionary data schema definition for extending the dictionary data schema to include additional media types for providing definition information for focused on words or text strings.

TABLE 3

```
<Headword><B>insert</B></Headword>
<Num>1.</Num><Text><I>noun in magazine etc encart masculin
    </I></Text>
<Num>2.</Num><Text>transitive verb; <B>insert something into
    something; inserer something dans something</B></Text>
<multimedia>
    <voice>\Program    Files\Common    Files\Microsoft
Shared\TRANSLAT\ENFR\voice\245685123.mpg</voice>
    <picture>\Program    Files\Common    Files\Microsoft
Shared\TRANSLAT\ENFR\picture\245685123.jpg</picture>
    <movie>  \Program        Files\Common  Files\Microsoft
Shared\TRANSLAT\ENFR\movie\245685123.avi</movie>
</multimedia>
```

As described herein, methods, systems and computer products provide a lightweight information user interface for displaying information about a focused-on text item, data item or other object in an electronic document that minimizes interruption of workflow with the electronic document. It will be apparent to those skilled in the art that various modifications or variations may be made in the present invention without departing from the scope or spirit of the invention. Other embodiments of the present invention will be apparent to those skilled in the art from consideration of the specification and practice of the invention disclosed herein.

We claim:

1. A method of providing information associated with a focused-on item in an electronic document, comprising:
    receiving a first user-initiated selection comprising a focus on an item contained in an electronic document;
    evaluating a current mode of the electronic document selected from a first mode in which a plurality of editing functions of the electronic document are disabled, and a second mode in which the plurality of editing functions of the electronic document are enabled;
    automatically initiating a search for information on the focused-on item when the current mode is evaluated as the first mode;
    receiving a second user-initiated selection for initiating the search for information on the focused-on item when the current mode is evaluated as the second mode, wherein the second user selection is selected from a group comprising: a simultaneous keyboard and mouse selection; and a control selection accessed in one of a control toolbar and a drop-down menu;
    passing data representing the focused-on item to an information source following initiating the search for information on the focused-on item;
    receiving the information associated with the focused-on item from the information source;
    automatically displaying the returned information associated with the focused-on item in a user interface in the electronic document in proximity to the focused-on item; and when the information associated with the focused-on item will not fit in an available display space provided in the user interface:
        truncating a portion of the information such that only a portion of the information that will fit in the available display space provided in the user interface is displayed; and
        disposing a selectable control tab on a first side the user interface which, when selected, causes a display of the truncated portion of the information, the selectable control tab including:
            a first selectable tab which, when selected, causes to be displayed a first portion of the truncated portion of the information; and a second selectable tab which, when selected, causes to be displayed a second portion of the truncated portion of the information;

the first and second selectable tabs extending from the user interface, with the first selectable tab being positioned above the second selectable tab.

2. The method of claim 1, wherein receiving the information associated with the focused-on item includes receiving the information associated with the focused-on item in a format associated with each of a plurality of media types, and further comprising providing access to the information associated with the focused-on item in the format associated with each of the plurality of media types via the displayed user interface.

3. The method of claim 2, wherein providing access to the information associated with the focused-on item in the format associated with each of the plurality of media types includes providing an audio file that may be selected from the displayed user interface for providing the information associated with the focused-on item in audio format.

4. The method of claim 2, wherein providing access to the information associated with the focused-on item in the format associated with each of the plurality of media types includes providing a video file that may be selected from the displayed user interface for providing the information associated with the focused-on item in video format.

5. The method of claim 2, wherein providing access to the information associated with the focused-on item in the format associated with each of the plurality of media types includes providing a picture that may be formatted according to one or more formatting types that may be displayed in the user interface for providing the information associated with the focused-on item in video format.

6. The method of claim 1, wherein passing data representing the focused-on item to an information source includes passing an Extensible Markup Language (XML) formatted query to the information source that identifies a type of information associated with the focused-on item that is requested from the information source.

7. The method of claim 6, further comprising providing a schema definition for information contained in the information source for allowing the XML formatted query to obtain the type of information associated with the focused-on item that is requested from the information source.

8. The method of claim 7, wherein providing a schema definition for information contained in the information source for allowing the XML formatted query to obtain the type of information associated with the focused-on item that is requested from the information source, includes providing a schema definition for the information associated with the focused-on item in each of the plurality of media types for allowing the XML formatted query to request the information associated with the focused-on item according to any media type supported by the schema definition.

9. The method of claim 7, wherein providing a schema definition for information contained in the information source for allowing the XML formatted query to obtain the type of information associated with the focused-on item that is requested from the information source, includes providing a schema definition for the information associated with the focused-on item for allowing the XML formatted query to return the information associated with the focused-on item for presentation in the displayed user interface according to a prescribed layout.

10. The method of claim 1, wherein passing data representing the focused-on item to an information source includes:

passing the data representing the focused-on item to a recognizer module for determining whether the focused-on item corresponds to a given data type;

when the focused-on item corresponds to a given data type, passing the data representing the focused-on item to an information source containing information associated with the given data type; and wherein receiving the information associated with the focused-on item in a format associated with each of a plurality of media types includes receiving information associated with the focused-on item that is further associated with the given data type in a format associated with each of a plurality of media types.

11. The method of claim 1, wherein passing data representing the focused-on item to an information source includes passing the data representing the focused-on item to a dictionary source for obtaining a definition of the focused-on item.

12. The method of claim 1, wherein passing data representing the focused-on item to an information source includes passing the data representing the focused-on item to a translation source for obtaining a translation of the focused-on item from a first language to a second language.

13. The method of claim 1, wherein if the information associated with the focused-on item is received from more than one information source, displaying the information in the user interface in one or more sections where information from a first information source is displayed in a first section and where information from a second information source is displayed in a second section.

14. The method of claim 13, wherein if an available display space in the user interface will not accommodate a display of all sections of information received for display in the user interface, displaying information from a number of sections that will fit in the user interface;

collapsing any sections of information the display of which will not fit in the user interface; and providing a selectable control in the user interface, which when selected, causes a display of an associated collapsed section of information.

15. The method of claim 14, further comprising prioritizing the sections of information according to a preferred display order where a most preferred section is displayed first and a least preferred section is displayed last.

16. A computer readable storage medium containing computer executable instructions which when executed by a computer perform a method of providing information associated with a focused-on item in an electronic document, comprising:

receiving a first user selection comprising a focus on an item contained in an electronic document;

passing data representing the focused-on item to a recognizer module for determining whether the focused-on item corresponds to a given data type;

evaluating a current mode of the electronic document selected from a first mode in which a plurality of editing functions of the electronic document are disabled, and a second mode in which the plurality of editing functions of the electronic document are enabled;

automatically initiating a search for information on the focused-on item when the current mode is evaluated as the first mode;

receiving a second user selection for initiating the search for information on the focused-on item when the current mode is evaluated as the second mode, wherein the second user selection is selected from a group comprising: a simultaneous keyboard and mouse selection; and a control selection accessed in one of a control toolbar and a drop-down menu;

when the focused-on item corresponds to a given data type, passing the data representing the focused-on item to an information source containing information associated with the given data type following initiating the search for information on the focused-on item;

at the information source, parsing a data source for information associated with the focused-on item;

returning information associated with the focused-on item;

displaying a user interface in the electronic document in proximity to the focused-on item; and displaying the returned information associated with the focused-on item in the user interface, wherein, when the information associated with the focused-on item will not fit in an available display space provided in the user interface:

truncating a portion of the information such that only a portion of the information that will fit in the available display space provided in the user interface is displayed; and disposing a selectable control tab on a first side the user interface, which when selected, causes a display of the truncated portion of the information, the selectable control tab including:

a first selectable tab which, when selected, causes to be displayed a first portion of the truncated portion of the information; and a second selectable tab which, when selected, causes to be displayed a second portion of the truncated portion of the information;

the first and second selectable tabs extending from the user interface, with the first selectable tab being positioned above the second selectable tab.

17. A computer readable storage medium containing computer executable instructions which when executed by a computer perform a method of providing information associated with a focused-on item in an electronic document, comprising:

receiving a first user-initiated selection comprising a focus on an item contained in an electronic document;

evaluating a current mode of the electronic document selected from a first mode in which a plurality of editing functions of the electronic document are disabled, and a second mode in which the plurality of editing functions of the electronic document are enabled;

automatically initiating a search for information on the focused-on item when the current mode is evaluated as the first mode;

receiving a second user selection for initiating the search for information on the focused-on item when the current mode is evaluated as the second mode, wherein the second user selection is selected from a group comprising: a simultaneous keyboard and mouse selection; and a control selection accessed in one of a control toolbar and a drop-down menu;

querying one or more data sources for information associated with the focused-on item following initiating the search for information on the focused-on item;

displaying a user interface in the electronic document in proximity to the focused-on item;

when the information associated with the focused-on item is received from more than one source, displaying the information in the user interface in one or more sections where information from a first data source is displayed in a first section and where information from a second data source is displayed in a second section; and when an available display space in the user interface will not accommodate a display of all sections of information received for display in the user interface:

displaying information from a number of sections that will fit in the user interface;

collapsing any sections of information the display of which will not fit in the user interface; and providing a selectable control tab on a first side of the user interface which, when selected, causes a display of an associated collapsed section of information, the selectable control tab including:

a first selectable tab which, when selected, causes to be displayed a first portion of the information; and a second selectable tab which, when selected, causes to be displayed a second portion of the information;

the first and second selectable tabs extending from the user interface, with the first selectable tab being positioned above the second selectable tab.

* * * * *